United States Patent
Moosavi et al.

(10) Patent No.: US 10,524,217 B2
(45) Date of Patent: *Dec. 31, 2019

(54) FIRST NETWORK NODE, A SECOND NETWORK NODE, A THIRD NETWORK NODE, AND METHODS THEREIN FOR ESTABLISHMENT OF A NEIGHBOUR RELATION

(71) Applicant: Telefonaktiebolaget LM Ericsson (publ), Stockholm (SE)

(72) Inventors: Reza Moosavi, Linköping (SE); Fredrik Gunnarsson, Linköping (SE); Pradeepa Ramachandra, Linköping (SE); Kristina Zetterberg, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 10 days.

This patent is subject to a terminal disclaimer.

(21) Appl. No.: 15/558,751

(22) PCT Filed: Oct. 28, 2016

(86) PCT No.: PCT/SE2016/051057
§ 371 (c)(1),
(2) Date: Sep. 15, 2017

(87) PCT Pub. No.: WO2018/080361
PCT Pub. Date: May 3, 2018

(65) Prior Publication Data
US 2018/0249430 A1    Aug. 30, 2018

(51) Int. Cl.
*H04W 72/04* (2009.01)
*H04W 56/00* (2009.01)
(Continued)

(52) U.S. Cl.
CPC ......... *H04W 56/001* (2013.01); *H04L 5/0048* (2013.01); *H04W 8/02* (2013.01);
(Continued)

(58) Field of Classification Search
CPC ... H04W 56/001; H04W 36/00; H04W 92/16; H04W 76/15; H04W 8/02; H04L 5/0048
See application file for complete search history.

(56) References Cited

U.S. PATENT DOCUMENTS 8,989,153 B2 * 3/2015 Uemura ............... H04W 24/10
370/332
2009/0264118 A1    10/2009 Robson
(Continued)

FOREIGN PATENT DOCUMENTS

WO    2011031194 A1    3/2011
WO    2012107175 A2    8/2012
(Continued)

OTHER PUBLICATIONS

Dahlen, Anders et al., "Evaluations of LTE Automatic Neighbor Relations", IEEE 73rd Vehicular Technology Conference (VTC Spring), May 15-18, 2011, 1-5.
(Continued)

*Primary Examiner* — Phuc H Tran
(74) *Attorney, Agent, or Firm* — Murphy, Bilak & Homiller, PLLC

(57) ABSTRACT

A first network node 104 and a method therein for establishing a neighbour relation with a second network node 106,106'. The first network node 104 and the second network node are operating in a wireless communications network 100, The first network node receives an uplink synchronisation signal from a communications device 110 operating in the wireless communications network. For neighbour node determination, the first network node transmits
(Continued)

mits, to a third network node 108 operating in the wireless communications network, a first information, which first information relates to the identity of the received signal and to a first reception time of the signal. The first network node establishes a neighbour relation with at least one of a second network node and one or more of one or more further second network nodes based on a neighbour node determination performed by the third network node based on the first information.

24 Claims, 14 Drawing Sheets

(51) Int. Cl.
*H04W 76/15* (2018.01)
*H04W 8/02* (2009.01)
*H04L 5/00* (2006.01)
*H04W 92/16* (2009.01)
*H04W 36/00* (2009.01)
*H04W 24/02* (2009.01)

(52) U.S. Cl.
CPC ..... *H04W 36/00835* (2018.08); *H04W 76/15* (2018.02); *H04W 92/16* (2013.01); *H04W 24/02* (2013.01)

(56) References Cited

U.S. PATENT DOCUMENTS

| 2012/0113938 | A1 | 5/2012 | Larsson et al. |
| 2013/0244718 | A1 | 9/2013 | Lee et al. |
| 2013/0322289 | A1* | 12/2013 | Zhu ............... H04J 11/0056 370/252 |
| 2014/0162646 | A1 | 6/2014 | Lee et al. |
| 2015/0223229 | A1 | 8/2015 | Bentland et al. |
| 2018/0249498 | A1* | 8/2018 | Moosavi ............. H04W 76/10 |

FOREIGN PATENT DOCUMENTS

| WO | 2015066861 A1 | 5/2015 |
| WO | 2018052343 A1 | 3/2018 |

OTHER PUBLICATIONS

Unknown, Author, "Automatic Base Station Relations in NR", 3GPP TSG-RAN WG3 #93, R3-161902, Ericsson, Gothenburg, Sweden, Aug. 22-26, 2016, 3 pages.

Unknown, Author, "Small Cell Discovery in HetNet Based on Existed Uplink Signal", 3GPP TSG-RAN WG2 #83, R2-132295, FiberHome Technologies Group, Barcelona, Spain, Aug. 19-23, 2013, 5 pages.

* cited by examiner

Figure 3 Method performed by first network node 104

Figure 5 Method performed by second network node 106

Figure 7 Method performed by third network node 108

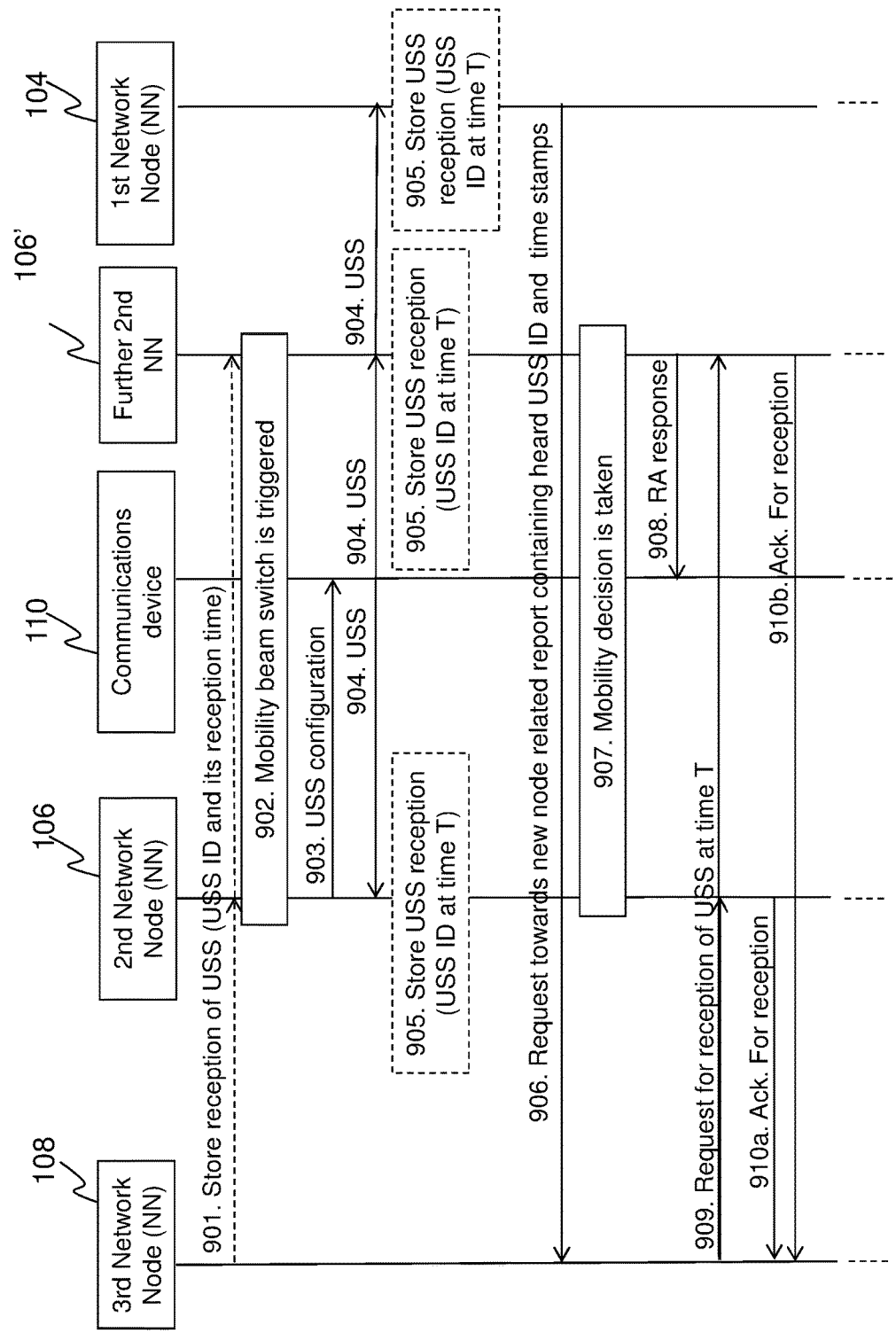
Figure 9 Uplink based AMM, to be continued

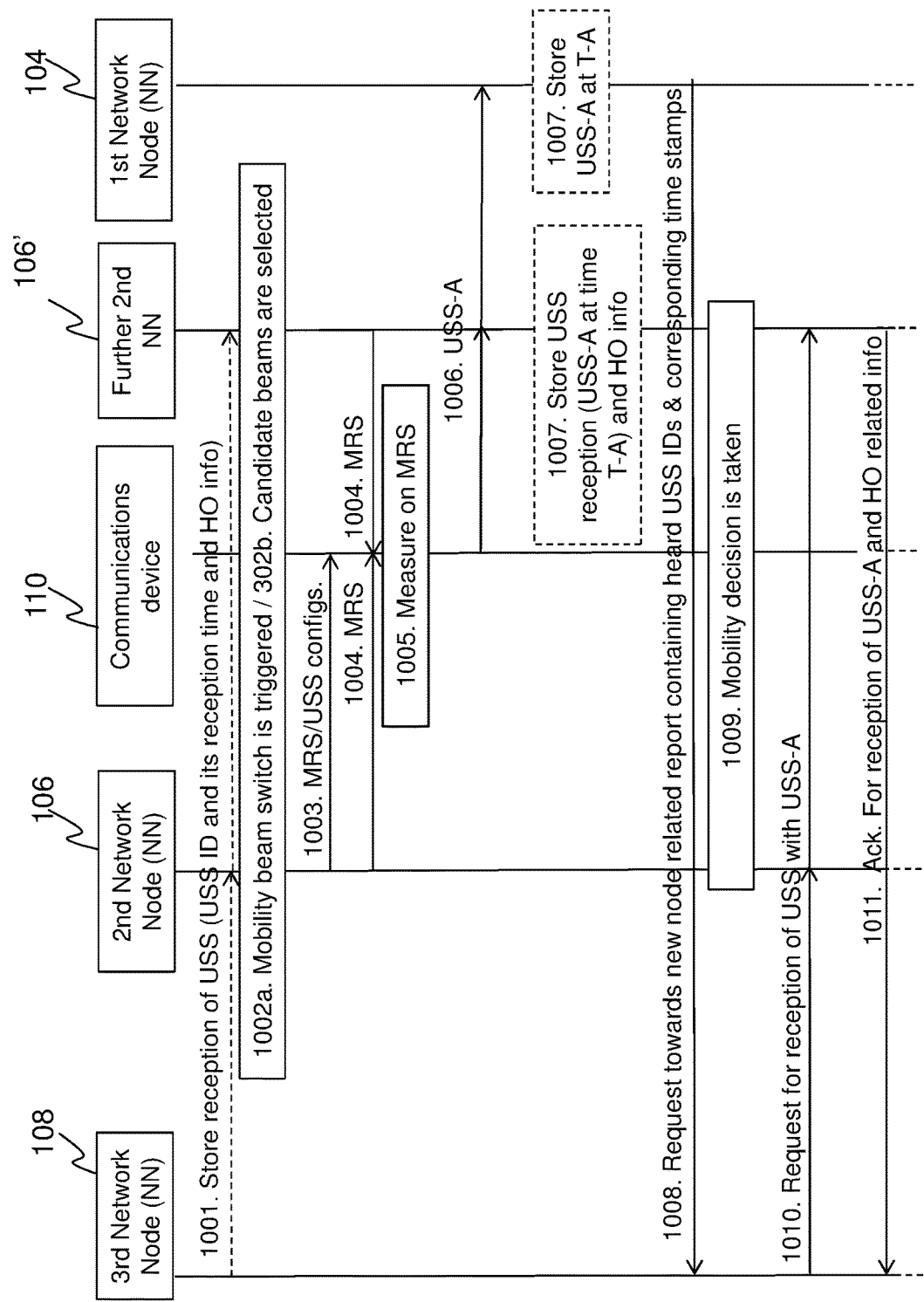
Figure 10 Hybrid based AMM, to be continued

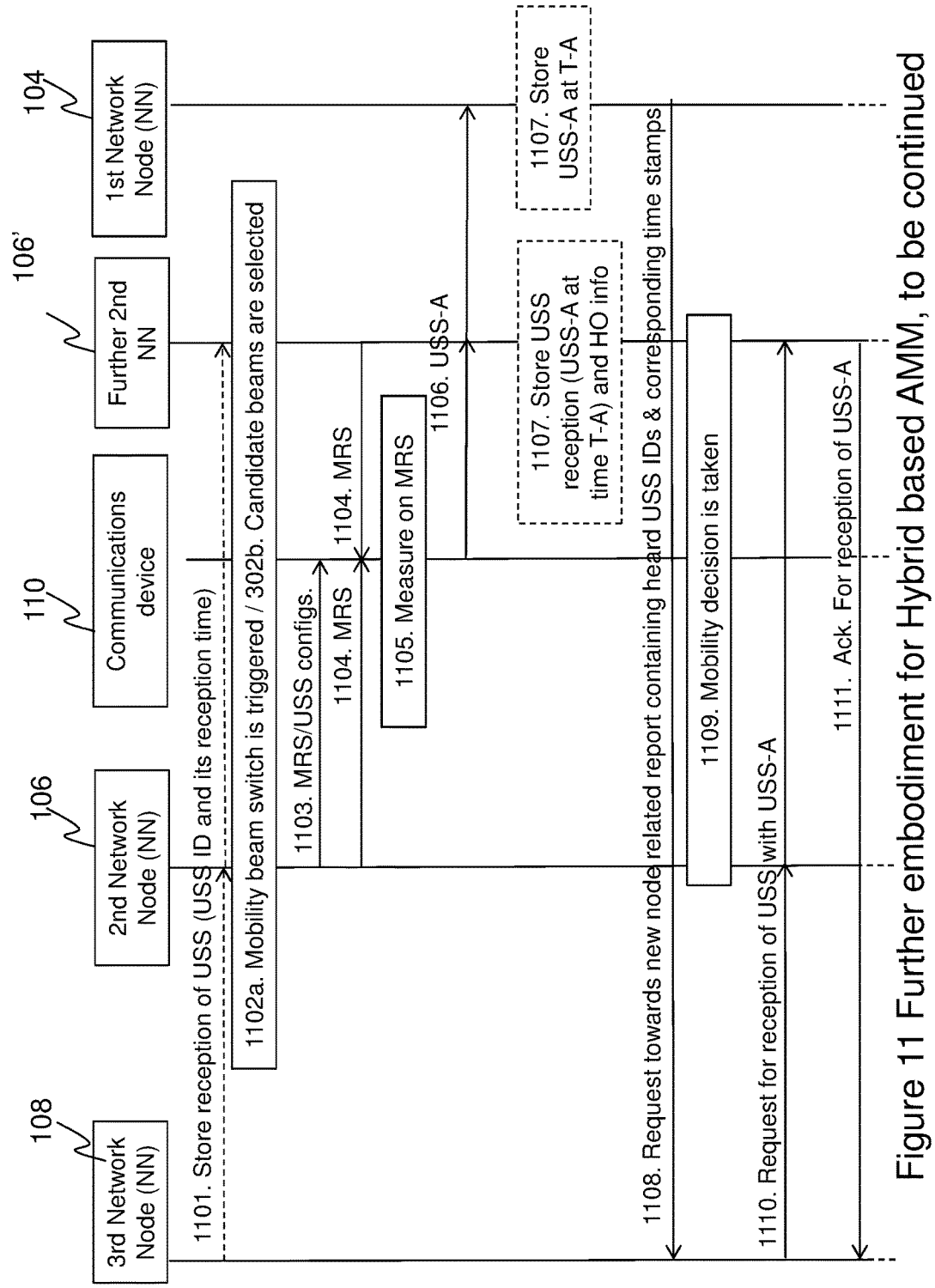
Figure 11 Further embodiment for Hybrid based AMM, to be continued

FIRST NETWORK NODE, A SECOND NETWORK NODE, A THIRD NETWORK NODE, AND METHODS THEREIN FOR ESTABLISHMENT OF A NEIGHBOUR RELATION

TECHNICAL FIELD

Embodiments herein relate generally to a first network node, a second network node, a third network node and to methods therein. In particular, embodiments herein relate to the establishment of a neighbour relation.

BACKGROUND

Communications devices such as terminals are also known as e.g. User Equipments (UEs), mobile terminals, stations (STAs), wireless devices, wireless terminals and/or mobile stations. Terminals are enabled to communicate wirelessly in a wireless communications network, such as a Wireless Local Area Network (WLAN) or a cellular communications network sometimes also referred to as a cellular radio system or cellular networks. The communication may be performed e.g. between two terminals, between a terminal and a regular telephone and/or between a terminal and a server via an access network and possibly one or more core networks, comprised within the wireless communications network.

The above communications devices may further be referred to as mobile telephones, cellular telephones, laptops, tablets or sensors with wireless capability, just to mention some further examples. The communications devices in the present context may be, for example, portable, pocket-storable, hand-held, wall-mounted, computer-comprised, or vehicle-mounted mobile devices. The communications devices are enabled to communicate voice and/or data, via an access network, such as a Radio Access Network (RAN), with another entity, such as e.g. an Access Point (AP), another communications device or a server.

The communications network covers an area, e.g. a geographical area, which is divided into subareas, such as service areas, coverage areas, cells or clusters. In a cellular communications network each cell area is served by an access node such as a base station, e.g. a Radio Base Station (RBS), which sometimes may be referred to as e.g. eNodeB (eNB), NodeB, B node, or Base Transceiver Station (BTS), depending on the technology and terminology used. The base stations may be of different classes such as e.g. macro eNodeB, home eNodeB, micro eNode B or pico base station, based on transmission power, functional capabilities and thereby also cell size. A traditional cell is the area where radio coverage is provided by the base station at a base station site. One base station, situated on the base station site, may serve one or several cells. Further, each base station may support one or several communication technologies. The base stations communicate over the air interface operating on radio frequencies with the communications devices within range of the base stations. In the context of this disclosure, the expression Downlink (DL) is used for the transmission path from the base station to the communications device. The expression Uplink (UL) is used for the transmission path in the opposite direction i.e. from the communications device to the base station.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO systems.

Ultra-Lean System Design of NeXt Generation (NX)

A design principle currently under consideration for the NX generation communications networks, also known as Next Radio or New Radio (NR) in 3GPP context, is to base it on an ultra-lean design. This implies avoidance of "always on signals" from the communications network as much as possible. Some examples of benefits from such design principle is expected to be a significantly lower network energy consumption, a better scalability, a higher degree of forward compatibility during the Radio Access Technology (RAT) evolution phase, a lower interference from system overhead signals and consequently higher throughput in low load scenario, and an improved support for user centric beam-forming.

Heavy Use of (Massive) Beam-Forming

Advanced Antenna Systems (AAS) is an area where technology has advanced significantly in recent years and where a rapid technology development in the years to come is foreseen. Hence it is natural to assume that advanced antenna systems in general and massive Multiple Input Multiple Output (MIMO) transmission and reception in particular will be a cornerstone in a future NX communications network.

Mobility Reference Signals

In deployments with large antenna arrays and many possible candidate beam configurations, all beams cannot transmit signals in an always-on, static manner for the sake of mobility measurements. Instead, the connected access nodes select a relevant set of mobility beams to transmit when required. Each mobility beam carries a unique Mobility Reference Signal (MRS). The communications device, e.g. the UE, is then instructed to measure on each MRS and report information relating to the performed measurement back to the communications network, e.g. to an access node. Based on some criteria, for example a difference between MRS strength between two mobility beams, a handover can be triggered. For mobility to work efficiently, the involved Access Nodes (ANs) need to maintain beam neighbour lists, exchange beam information, and coordinate MRS usage.

Access Node, e.g. Base Station, Relations

Despite advanced radio network planning tools, it is very difficult to predict the radio propagation in detail. As a consequence, it is difficult to predict which base stations that needs to have a relation with each other and maybe also a direct connection with each other prior to the network deployment. This has been addressed in LTE, where UEs could be requested to retrieve unique information from the system information broadcast of unknown base stations and report to the serving base station. Such information was used to convey messages to the unknown base station via the core network, which maintained a lookup table from a unique identifier to an established S1 connection. One such message was used to request transport network layer address information necessary for a direct base station to base station connection for the X2 interface. In order for smooth operations of the mobility procedure in the NX generation, the NX node needs to have a concrete list of neighbouring NX nodes which can be handover candidates for the UEs.

Active Mode Mobility (AMM)

When a communications device, e.g. a UE, moves in a service area, there might be a need to change the serving node and/or the serving beam in order to maintain a reasonable radio link between the UE and the wireless communications network.

A first way of handling Active Mode Mobility (AMM) is to use downlink reference signal transmissions similar to what is done in LTE communications networks of today. More precisely, each mobility beam carries a unique Mobility Reference Signal (MRS). The UE is then instructed to measure on each MRS and report to the wireless communications network. Based on some criteria, for example a difference between MRS strengths between two mobility beams, a handover can be triggered. However, as opposed to the LTE communications networks, in deployments with large antenna arrays and many possible candidate beam configurations, all beams cannot transmit reference signals in an always-on, static manner for the sake of mobility measurements. Instead, the connected Access Nodes, e.g. base stations such as eNBs, select a relevant set of mobility beams to transmit when required. For the mobility to work efficiently, therefore, the involved ANs need to maintain beam neighbor lists, exchange beam information, and coordinate MRS usage.

A second way to handle AMM is to use uplink based solutions for AMM management. The idea is to configure the UE to transmit a reference signal, denoted an Uplink Synchronization Signal (USS) here after, when the radio link deteriorates. The transmission of the USS may be triggered by either the UE or the communications network. One or more neighbor network nodes then measure the signal strength of the USS transmission and report it to the serving node. Based on the measurement report, the best beam is chosen and the UE is handed-over to the corresponding node.

A third way for handling AMM is to combine the downlink and the uplink based AMM mobility solutions into a so called hybrid solution for AMM management. The hybrid solution has a lower latency as compared to each of the downlink and uplink based solutions described above. In one alternative of the hybrid scheme, there is one USS reserved at the source node for each of the MRS transmissions. In case there is a need for beam switch, the MRS:s are transmitted by the candidate beams. The UE measures the signal strength of each MRS transmission, determines the best beam and reports it to the corresponding node via the provided USS of the beam. The serving node, based on the receipt USS, determines the target node and a Handover (HO) is initiated. Alternatively, the candidate nodes may reserve the USS for each MRS that they are transmitting and hence the UE, by measuring of the signal strengths of the MRS transmissions, is able to pick the strongest beam and send the USS of the corresponding beam which explicitly indicates the target node too. The corresponding network node would then reply with a random access response indicating that it will admit the UE.

In case the UE does not receive any response after some period of time in each of the alternatives described, it will pick the second strongest beam and follow the same procedure. The period of time may be predetermined and/or it may be fixed or adjustable.

A drawback with prior art solutions, such as the LTE solution, for establishing neighbour node relations is that they are based on the transmission of always-on signals, e.g. always-on reference signals. But the always-on signaling is absent or very sparse in a NX communications network by design and therefore are not very useful when establishing neighbor relations in a NX communications network which thus requires a different approach compared to the existing LTE solutions.

SUMMARY

An object of embodiments herein is to address at least some of the above-mentioned drawbacks among others and to improve the performance in a wireless communications network.

According to one aspect of embodiments herein, the object is achieved by a method performed by a first network node for establishing a neighbour relation with a second network node. The first network node and the second network node are operating in a wireless communications network.

The first network node receives an uplink synchronisation signal from a communications device operating in the wireless communications network.

For neighbour node determination, the first network node transmits, to a third network node operating in the wireless communications network, a first information. The first information relates to the identity of the received uplink synchronisation signal and to a first reception time of the uplink synchronisation signal.

The first network node establishes a neighbour relation with at least one of a second network node and one or more of one or more further second network nodes based on a neighbour node determination performed by the third network node based on the first information.

According to another aspect of embodiments herein, the object is achieved by a first network node for establishing a neighbour relation with a second network node. The first network node and the second network node are configured to operate in a wireless communications network.

The first network node is configured to receive an uplink synchronisation signal from a communications device operating in the wireless communications network.

For neighbour node determination, the first network node is configured to transmit, to a third network node operating in the wireless communications network, a first information. The first information relates to the identity of the received uplink synchronisation signal and to a first reception time of the uplink synchronisation signal.

The first network node is configured to establish a neighbour relation with at least one of a second network node and one or more of one or more further second network nodes based on a neighbour node determination performed by the third network node based on the first information.

According to another aspect of embodiments herein, the object is achieved by a method performed by a second network node for establishing a neighbour relation with a first network node. The first network node and the second network node are operating in a wireless communications network.

The second network node receives an uplink synchronisation signal from a communications device operating in the wireless communications network.

For neighbour node determination, the second network node transmits to a third network node operating in the wireless communications network, a second information. The second information relates to an identity of the received uplink synchronisation signal and to a second reception time of the uplink synchronisation signal.

The second network node establishes a neighbour relation with the first network node based on a neighbour node determination performed by the third network node based on the second information.

According to another aspect of embodiments herein, the object is achieved by a second network node for establishing a neighbour relation with a first network node. The first network node and the second network node are configured to operate in a wireless communications network.

The second network node is configured to receive an uplink synchronisation signal from a communications device operating in the wireless communications network.

For neighbour node determination, the second network node is configured to transmit to a third network node operating in the wireless communications network, a second information. The second information relates to an identity of the received uplink synchronisation signal and to a second reception time of the uplink synchronisation signal.

The second network node is configured to establish a neighbour relation with the first network node based on a neighbour node determination performed by the third network node based on the second information.

According to another aspect of embodiments herein, the object is achieved by a method performed by a third network node for requesting establishment of a neighbour relation between a first network node and a second network node. The first network node and the second network node are operating in a wireless communications network.

The third network node receives, from the first network node, a first information. The first information relates to an identity of a received uplink synchronisation signal and relating to a first reception time of the received uplink synchronisation signal.

The third network node receives, from at least one out of a second network node and one or more further second network nodes, a second information. The second information relates to the identity of the received uplink synchronisation signal and to a second reception time of the received uplink synchronisation signal.

Further, the third network node determines the first network node and the at least one out of the second network node and the one or more further second network nodes as being neighbour nodes based on the first information and the second information.

Furthermore, the third network node requests the first network node and/or the at least one out of the second network node and the one or more further second network nodes to establish a neighbour relation.

According to another aspect of embodiments herein, the object is achieved by a third network node for requesting establishment of a neighbour relation between a first network node and a second network node. The first network node and the second network node are configured to operate in a wireless communications network.

The third network node is configured to receive, from the first network node, a first information. The first information relates to an identity of a received uplink synchronisation signal and relating to a first reception time of the received uplink synchronisation signal.

The third network node is configured to receive, from at least one out of a second network node and one or more further second network nodes, a second information. The second information relates to the identity of the received uplink synchronisation signal and to a second reception time of the received uplink synchronisation signal.

Further, the third network node is configured to determine the first network node and the at least one out of the second network node and the one or more further second network nodes as being neighbour nodes based on the first information and the second information.

Furthermore, the third network node is configured to request the first network node and/or the at least one out of the second network node and the one or more further second network nodes to establish a neighbour relation.

According to another aspect of embodiments herein, the object is achieved by a computer program, comprising instructions which, when executed on at least one processor, causes the at least one processor to carry out the method performed by the first network node.

According to another aspect of embodiments herein, the object is achieved by a computer program, comprising instructions which, when executed on at least one processor, causes the at least one processor to carry out the method performed by the second network node.

According to another aspect of embodiments herein, the object is achieved by a computer program, comprising instructions which, when executed on at least one processor, causes the at least one processor to carry out the method performed by the third network node.

According to another aspect of embodiments herein, the object is achieved by a carrier comprising the computer program, wherein the carrier is one of an electronic signal, an optical signal, a radio signal or a computer readable storage medium.

Since the first network node transmits, to the third network, the first information for neighbour node determination, which first information relates to the identity of the received uplink synchronisation signal and to a first reception time of the uplink synchronisation signal, and since the first network node establishes a neighbour relation with the second network node based on a neighbour node determination performed by the third network node based on the first information, a simplified establishment of a neighbour node relation is provided. This results in an improved performance in the wireless communications network.

An advantage with embodiments herein is that the prior art always-on signalling is not needed for establishment of a neighbour relation.

Further, an advantage with embodiments herein is that the network nodes, e.g. the first and second network nodes, may establish inter-node beam relations as well as neighbour relations.

Furthermore, an advantage with embodiments herein is that the network nodes, e.g. the first and second network nodes, operating in the wireless communications network, e.g. a NX wireless communications network, may establish neighbour node relations without sacrificing the ultra-lean design principle, i.e., without needing to broadcast unique node identities.

Yet further, an advantage with embodiments herein is that the node relation may be established without additional uplink transmission from the communications device.

BRIEF DESCRIPTION OF DRAWINGS

Examples of embodiments herein are described in more detail with reference to attached drawings in which.

DETAILED DESCRIPTION

Figure 1:
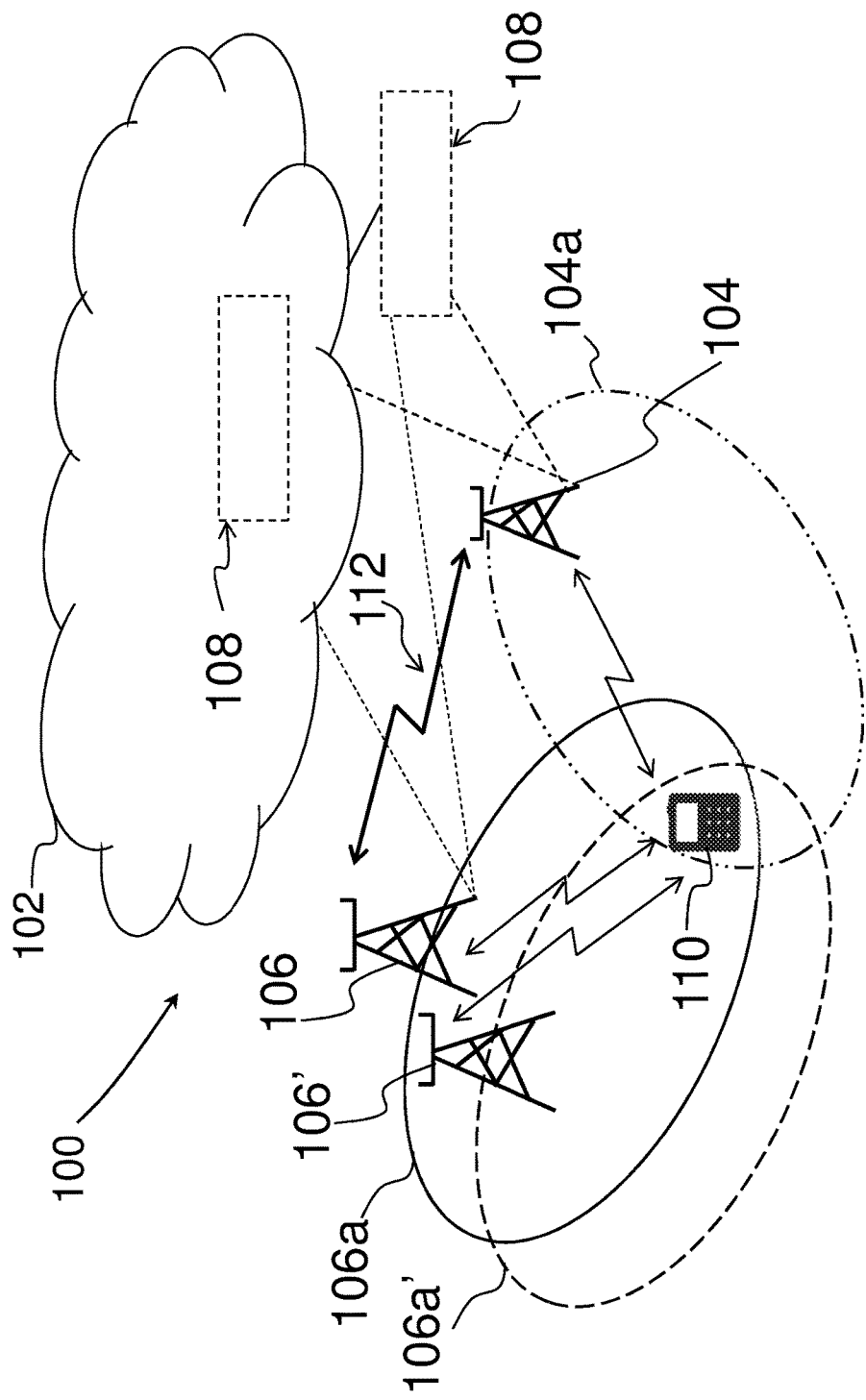
FIG. 1 is a schematic block diagram schematically illustrating embodiments of a wireless communications network.

In order to facilitate understanding of embodiments herein, a drawback with the state of the art communications networks will first be identified and discussed.

As mentioned above, one drawback with prior art solutions for establishing neighbor node relations, e.g. neighbor base station relations, is that they are based on the transmission of always-on signals, e.g. always-on reference signals. But the always-on signaling is absent or almost absent in the NX communications networks by design and therefore a different approach is required as compared to the existing LTE solutions.

An object addressed by embodiments herein is therefore how to improve performance in a wireless communications network.

Therefore, as mentioned above, according to embodiments herein, a way of improving the performance in the wireless communications network is provided. Further, some embodiments disclosed herein relate to the establishment, e.g. the automatic establishment, of neighbour relations in the wireless communications network.

In order to overcome the above-mentioned drawback, embodiments herein provide a method to establish neighbour relations when a first network node, e.g. a new network node, such as a new NX network node, is installed in an existing wireless communications network, e.g. an existing NX communications network. However, it should be understood that the first network node may be an existing network node, e.g. a network node already existing in the wireless communications network, and which network node needs to find new neighbour relations. For example, this may be the case when the physical environment is changed in the vicinity of the node, for example when a new building is constructed or a new road is opened.

An idea used in the procedure is to use the one or more reference signals, e.g. the Uplink Synchronization Signals (USSs), transmitted by communications devices in both uplink based Active Mode Mobility (AMM) solutions and hybrid based AMM solutions to establish network neighbour relations. It should be understood that in hybrid based AMM solutions reference signals transmitted in both uplink and downlink are used.

For example, the USS may be a signal similar to random access signal but using a different logical channel in order to avoid PRACH related access confusion. Since a node receiving the USS may take different actions when the communications device is transmitting USS, e.g. a physically PRACH like signal in another channel, and when the communications device is transmitting PRACH. In the former, the network node uses the measurement to evaluated the UL quality and shares the info with other node whereas in the latter case, the network node sends a Random Access (RA) response to the communications device.

More specifically, a first network node, such as a newly deployed NX node, will listen for USS transmissions and report the transmissions that it is able to hear to a third network node to check which one or more network nodes, e.g. a second network node, the heard transmissions correspond to. Based on this information exchange, the first network node is able to establish a neighbour relation with its neighbouring network nodes, e.g. the second network node. These one or more second network nodes is sometimes in this disclosure referred to as the first network node's neighbouring network nodes or just neighbour nodes.

Embodiments disclosed herein relate to recent technology trends that are of particular interest in a 5G context. However embodiments disclosed herein are applicable also in further development of the existing mobile broadband systems such as WCDMA and LTE.

Note that although terminology from 3GPP LTE may be used in this disclosure to exemplify the embodiments herein, this should not be seen as limiting the scope of the embodiments herein to only the aforementioned system. Other wireless systems, including Wideband Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

In this section, the embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Embodiments herein relate to a wireless communications network 100 as schematically illustrated in FIG. 1. For example, embodiments herein may be implemented in the wireless communications network 100. The wireless communications network 100 may be a cellular communications network, such as e.g. a 5G network, an LTE network, a WCDMA network, an GSM network, any 3GPP cellular network, a WiMAX network, or any other wireless communications network or system.

A core network 102 may be comprised in the wireless communications network 100. The core network 102 is configured to operate in the wireless communications network 100. The core network 102 may be a wireless core network such as a 5G core network, an LTE core network, e.g. an Evolved Packet Core (EPC) network; a WCDMA core network; a GSM core network; any 3GPP core network; WiMAX core network; or any cellular core network.

A first network node 104 operates in the wireless communications network 100. The first network node 104 is sometimes in this disclosure referred to as a newly deployed node, and is thus a node that is newly installed to operate in the communications network 100. However, as previously mentioned, it should be understood that the first network node 104 may be an existing network node, e.g. a network node already exiting in the wireless communications network 100, and which network node needs to find new neighbour relations.

The first network node 104 may be a radio access node such as a radio base station, for example an eNodeB, also denoted eNB, a Home eNodeB, or a NodeB or any other network node capable to serve a communications device 110 when located within a first area 104a, e.g. a first geographical area, in a communications network, such as the communications network 100. In this disclosure, the first area 104a is sometimes referred to as a first coverage area, a first cell or a first cluster wherein the first network node 104 provides radio coverage, i.e. a radio transmission from the first network node 104 may be received within the first area 104a. Herein, this is also specified as the first network node 104 manages or is configured to manage communication with the communications device 110 in the first area 104a. Sometimes in this disclosure this is also referred to as the first network node 104 is associated with the communications device 110 when it is located and/or operates within the first area 104a.

Thus, the terms first area 104a, first coverage area 104a, first cell 104a and first cluster 104a may be used interchangeably.

Other examples of the first network node 104 are Multi-Standard Radio (MSR) nodes such as MSR BS, network controllers, Radio Network Controllers (RNCs), Base Station Controllers (BSCs), relays, donor nodes controlling relay, Base Transceiver Stations (BTSs), Access Points (APs), transmission points, transmission nodes, Remote Radio Units (RRUs), Remote Radio Heads (RRHs), nodes in Distributed Antenna System (DAS) etc.

A second network node 106 operates in the wireless communications network 100. The second network node 106 is sometimes in this disclosure referred to as an existing node, and is thus a node operating in the communications network 100 before the introduction of the first network node 104 into the communications network 100.

The second network node 106 may be a radio access node such as a radio base station, for example an eNodeB, also denoted eNB, a Home eNodeB, or a NodeB or any other network node capable to serve a communications device 110 when located within a second area 106a, e.g. a second geographical area, in a communications network, such as the communications network 100. In this disclosure, the second area 106a is sometimes referred to as a second coverage area, a second cell or a second cluster wherein the second network node 106 provides radio coverage, i.e. a radio transmission from the second network node 106 may be received within the first area 106a. Herein, this is also specified as the second network node 106 manages or is configured to manage communication with the communications device 110 in the second area 106a. Sometimes in this disclosure this is also referred to as the second network node 106 is associated with the communications device 110 when it is located and/or operates within the second area 106a.

Thus, the terms second area 106a, second coverage area 106a, second cell 106a and second cluster 106a may be used interchangeably.

Other examples of the second network node 106 are Multi-Standard Radio (MSR) nodes such as MSR BS, network controllers, Radio Network Controllers (RNCs), Base Station Controllers (BSCs), relays, donor nodes controlling relay, Base Transceiver Stations (BTSs), Access Points (APs), transmission points, transmission nodes, Remote Radio Units (RRUs), Remote Radio Heads (RRHs), nodes in Distributed Antenna System (DAS) etc.

One or more further second network nodes 106' may operate in the wireless communications network 100. The one or more further second network nodes 106' are sometimes in this disclosure referred to as one or more further existing nodes, and are thus nodes operating in the communications network 100 before the introduction of the first network node 104 into the communications network 100.

Each one of the one or more further second network nodes 106' may be a radio access node such as a radio base station, for example an eNodeB, also denoted eNB, a Home eNodeB, or a NodeB or any other network node capable to serve a communications device 110 when located within a respective further second area 106a', e.g. a further second geographical area, in a communications network, such as the communications network 100. In this disclosure, each one of the one or more further second area 106a' is sometimes referred to as a further second coverage area, a further second cell or a further second cluster wherein one of the one or more further second network node 106' provides radio coverage, i.e. a radio transmission from the one or more further second network nodes 106' may be received within the respective further second area 106a'. Herein, this is also specified as each one of the one or more further second network nodes 106' manages or is configured to manage communication with the communications device 110 in the respective further second area 106a'. Sometimes in this disclosure this is also referred to as each one of the one or more of the further second network nodes 106' is associated with the communications device 110 when it is located and/or operates within the respective further second area 106a'.

Thus, the terms further second area 106a', further second coverage area 106a', further second cell 106a' and further second cluster 106a' may be used interchangeably.

Other examples of the one or more further second network node 106' are Multi-Standard Radio (MSR) nodes such as MSR BS, network controllers, Radio Network Controllers (RNCs), Base Station Controllers (BSCs), relays, donor nodes controlling relay, Base Transceiver Stations (BTSs), Access Points (APs), transmission points, transmission nodes, Remote Radio Units (RRUs), Remote Radio Heads (RRHs), nodes in Distributed Antenna System (DAS) etc.

A third network node 108 operates in the wireless communications network 100. The third network node 108 may be a new network node such as Positioning Management Entity (PME) or it may be comprised in an existing network node such as Operation and Maintenance (OAM).

In some embodiments, the third network node 108 operates in the core network 102, and then the third network node 108 may be a core network node or it may be comprised in the core network node. For example, the core network node may be an Evolved-Serving Mobile Location Centre (E-SMLC), a Mobile Switching Center (MSC), a Mobility Management Entity (MME), a Serving GateWay (S-GW), a Serving General Packet Radio Service (GPRS) Node (SGSN), etc.

Alternatively, the third network node 108 may be arranged separately from and in communication with the core network 102.

In some embodiments, the third network node 108 corresponds to a node or is comprised in a node that operates in a so called computer cloud or computing cloud. The node operating in the cloud may be referred to as a cloud node, and thus the third network node 108 may correspond to the cloud node or the third network node 108 may be comprised in the cloud node. The computing cloud may also be referred to as a cloud system of servers or computers, or simply be named a cloud for providing certain service(s) to outside the cloud via a communication interface. The exact configuration of nodes etc. comprised in the cloud in order to provide said service(s) may not be known outside the cloud. The name "cloud" is often explained as a metaphor relating to that the actual device(s) or network element(s) providing the services are typically invisible for a user of the provided service(s), such as if obscured by a cloud.

A communications device 110 operates in the wireless communications network 100. In some embodiments disclosed herein, the non-limiting term User Equipment (UE) is used and it refers to any type of communications device communicating with a network node in a communications network. Examples of communications devices are wireless devices, target devices, device to device UEs, machine type UEs or UEs capable of machine to machine communication, Personal Digital Assistants (PDA), iPADs, Tablets, mobile terminals, smart phones, Laptop Embedded Equipped (LEE), Laptop Mounted Equipment (LME), USB dongles etc.

In this disclosure the terms communications device, wireless device and UE are used interchangeably. Further, it should be noted that the term UE used in this disclosure also covers other communications devices such as Machine Type of Communication (MTC) device, an Internet of Things (IoT) device, e.g. a Cellular IoT (CIoT) device. Please note the term user equipment used in this document also covers other wireless devices such as Machine to Machine (M2M) devices, even though they do not have any user.

An example of how the first network node 104, the second network node 106, the third network node 108 and the communications device 110 may operate for establishment of a neighbour relation, such as a neighbour relation between the first and second network nodes 104, 106, will now be described with reference to the combined flowchart and signalling scheme depicted in FIG. 2. As previously mentioned, the first, second and third network nodes 104, 106, 108 and the communications device 110 are operating in the wireless communications network 100.

The neighbour relation may be a node neighbour relation or a beam neighbour relation, wherein the node neighbour relation relates to a relation between neighbouring nodes and the beam neighbour relation relates to a relation between neighbouring beams. Thus, the neighbour relation may describe as a connection between two neighbouring nodes, e.g. between two neighbouring network nodes, or it may describe a connection between two beams. Further, two network nodes may be considered as being neighbouring nodes when they are located within a radio coverage of each other and/or within radio coverage of the communication device 110. Furthermore, two beams may be considered as being neighbouring beams when they are located within a radio coverage of each other and/or within radio coverage of the communication device 110.

Figure 2:
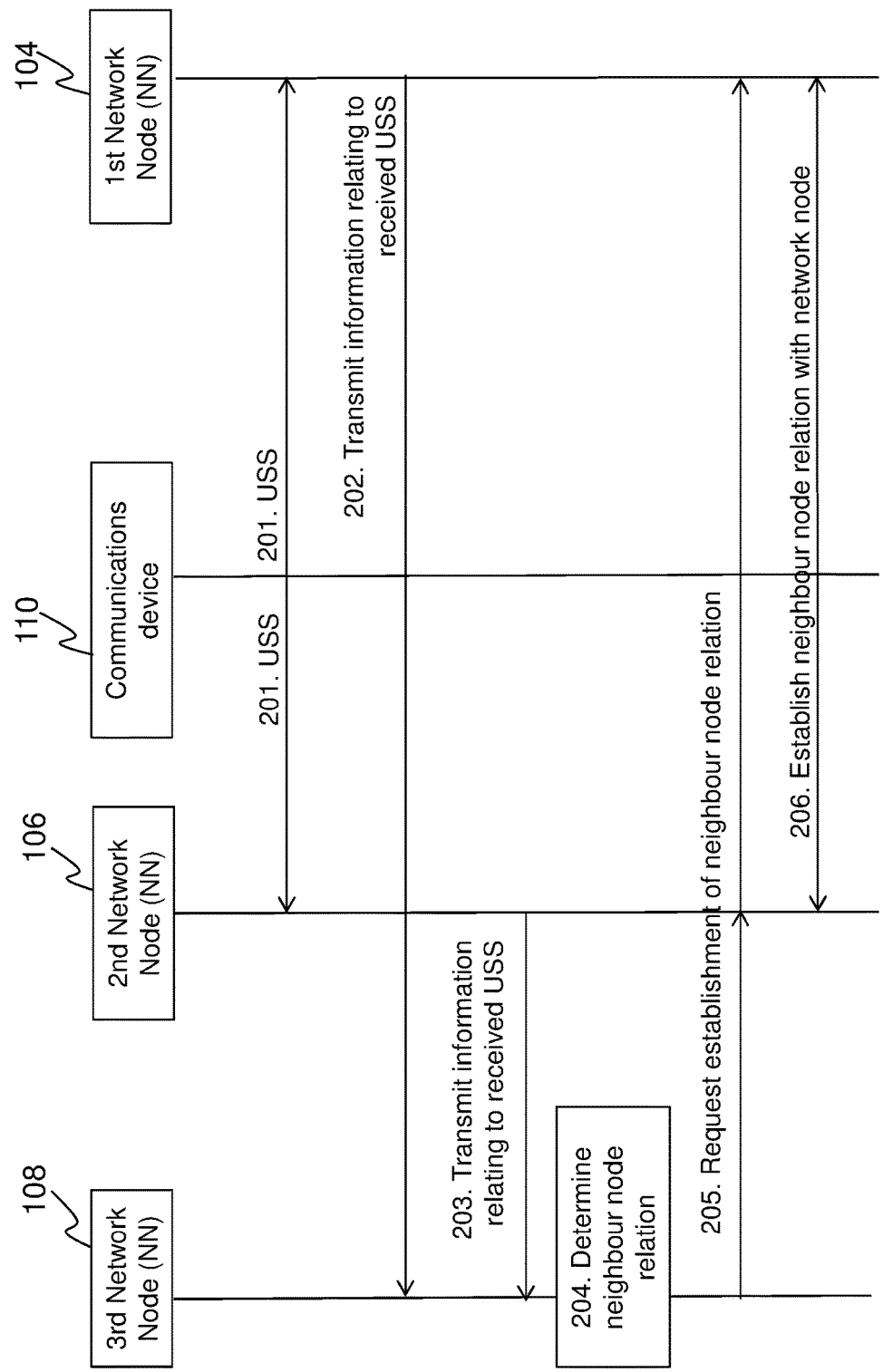
FIG. 2 is a schematic combined flowchart and signalling scheme of embodiments of a wireless communications network.

Further, it should be understood that, even if not shown in FIG. 2, one or more further second network nodes 106' may operate in the communications network 100. Therefore, in the Actions 201-206 below, a reference to the second network node 106 may be interpreted as a reference to the second network node 106 and/or to one or more out of the one or more further second network nodes 106'.

The procedure depicted in FIG. 2 comprises one or more of the following actions. It should be understood that these actions may be taken in any suitable order and that some actions may be combined.

Action 201

The communications device 110 transmits a reference signal, e.g. an Uplink Synchronisation Signal (USS), which is received by the first and the second network nodes 104, 106. As mentioned above, the communications device 110 may transmit the USS, when for example a radio link deteriorates, in order to enable one or more neighbouring network nodes to perform measurements on the USS and to report the result of the measurements to a serving network node, whereby handover to a better serving network node may be triggered. For example, the second network node 106 may be the serving network node and one or more of the further second network nodes 106' may be candidate network nodes for a handover. This will be described in more detail below.

This Action relates to Actions 301 and 503 to be described below.

Action 202

In order to inform the third network node 108 about the received USS, the first network node 104 transmits information, e.g. first information, relating to the received USS to the third network node 108. The first information relates to an identity of the received USS and relates to a first reception time of the received USS.

This Action relates to Action 302 to be described below.

Action 203

In order to inform the third network node 108 about the received USS, the second network node 104 transmits information, e.g. second information, relating to the received USS to the third network node 108. The second information relates to an identity of the received USS and relates to a second reception time of the received USS. Optionally, the second information may also comprise handover related information, such as information relating to one or more further second network node 106' that also received the USS transmitted from the communications device 110 as described in Action 201 above.

This Action relates to Action 505 to be described below.

Action 204

Based on the received first and second information, the third network node 108 determines a neighbour relation, e.g. a neighbour relation between the first and second network nodes 104,106. Specifically, based on the received first and second information, the third network node 108 determines whether or not the first and second network nodes 104,106 are neighbouring network nodes. For example, the third network node 108 may be able to determine the first and second network nodes 104,106 as being neighbouring nodes if they received the same uplink synchronization signal at the same or similar point of time. By similar point of time is meant that difference in reception time corresponds to the different distance of the propagation paths from the communications device 110 to the first network node 104, and from the communications device 110 to the second network node 106.

Additionally, the third network node 108 may determine that one or more further second network node 106' are neighbour nodes to the first network node 104, based on the handover related information comprised in the received second information.

This Action relates to Action 705 to be described below.

Action 205

Based on the performed neighbor node determination, the third network node 108 instructs the first network node 104 and/or the second network node 106 to establish a neighbor node relation with the other one network node. In other words, the third network node 108 may instruct the first network node 104 to establish a neighbor node relation with the second network node 106 and/or the third network node 108 may instruct the second network node 106 to establish a neighbor node relation with the first network node 104.

This Action relates to Action 706 to be described below.

Action 206

The first and second network nodes 104, 106 establish a neighbour node relation with each other.

This Action relates to Actions 306 and 508 to be described below.

Figure 3:
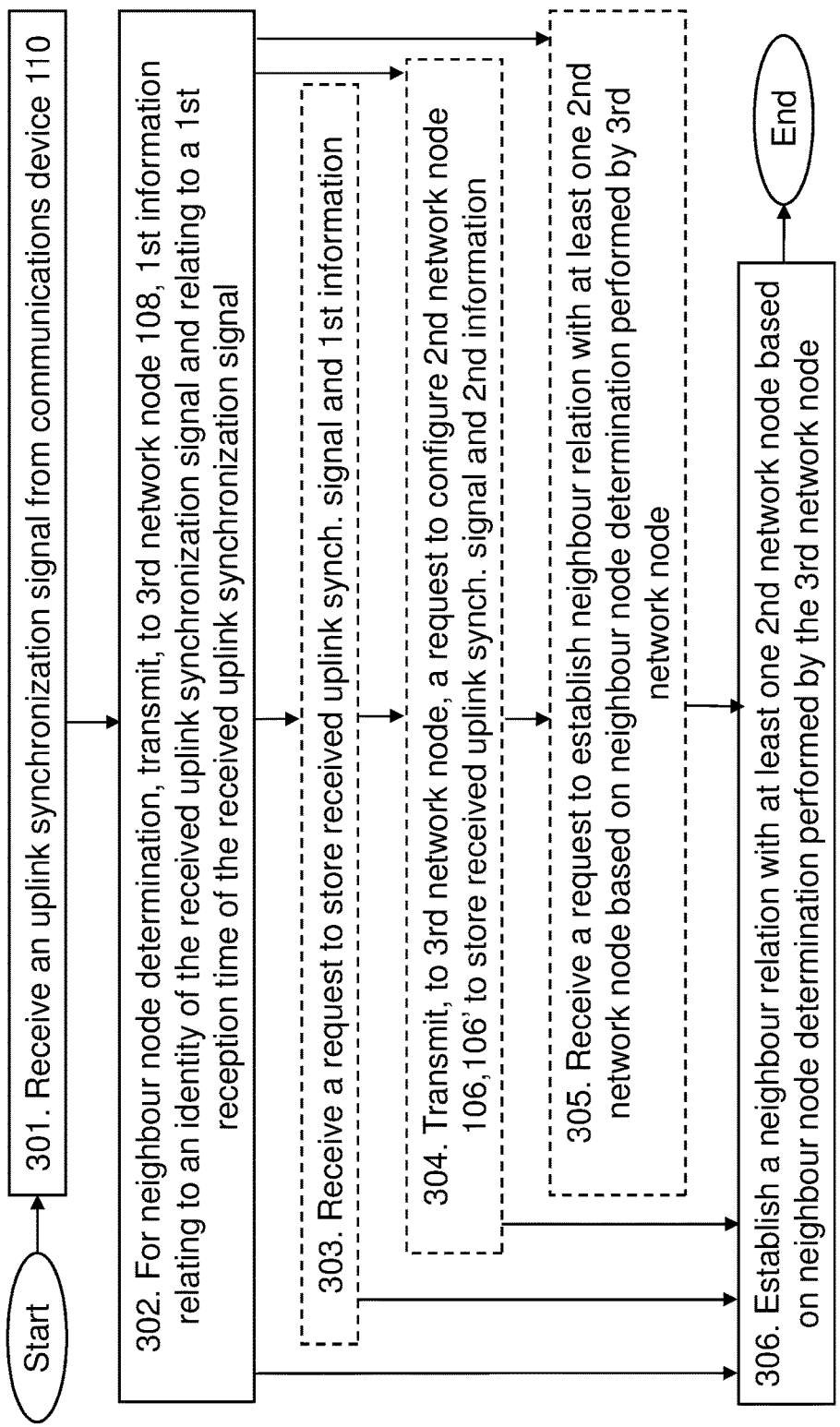
FIG. 3 is a flowchart schematically illustrating embodiments of a method performed by a first network node.

Examples of methods performed by the first network node 104 for establishing a neighbour relation with a second network node 106,106' will now be described with reference to the flowchart depicted in FIG. 3. As previously mentioned, the first network node 104 and the second network node 106,106' are operating in the wireless communications network 100. Further, as also previously mentioned, the neighbour relation may be a node neighbour relation or a beam neighbour relation, wherein the node neighbour relation relates to a relation between neighbouring nodes and the beam neighbour relation relates to a relation between neighbouring beams.

The methods comprise one or more of the following actions. It should be understood that the actions may be taken in any suitable order and that some actions may be combined. Actions that are optional are presented in dashed boxes in FIG. 3.

Action 301

The first network node 104 receives a reference signal, e.g. an Uplink Synchronisation Signal (USS), from a communications device 110 operating in the wireless communications network 100.

This Action relates to Action 201 previously described.

Action 302

For neighbour node determination, the first network node 104 transmits, to the third network node 108 operating in the wireless communications network 100, a first information, which first information relates to an identity of the received uplink synchronisation signal and to a first reception time of the received uplink synchronisation signal.

In some embodiments, the first information may be an ACK or a NACK or it may comprise an ACK or a NACK. Thus, sometimes in this disclosures, the first information is an ACK or a NACK, or the first information comprises an ACK or a NACK. For example, the first information may comprise an ACK by means of which the first network node 104 acknowledges reception of the uplink synchronization signal at the point of time T. Thus, the first information, e.g. the ACK, relates to the identity of the uplink synchronization signal and to the first reception time, e.g. to the point of time T.

In some embodiments, the first network node 104 transmits the first information to the third network node 108 when a signal strength of the received uplink synchronisation signal is above a threshold value.

This Action relates to Action 202 previously described.

Action 303

In some embodiments, the first network node 104 receives, from the third network node 108, a request to store the received uplink synchronisation signal and the first information. Thereby, the first network node 104 may be instructed to store signals and information that may be reported to a network node, e.g. the third network node 108 at a later point in time.

Action 304

In some embodiments, the first network node 104 transmits, to the third network node 108, a request to configure the second network node 106 and/or one or more further second network nodes 106' to store the uplink synchronisation signal when received by the second network node 106 or by the one or more further second network nodes 106' and to store a second information. The second information may relate to the identity of the received uplink synchronisation signal and to a second reception time of the received uplink synchronisation signal, when received by the respective any one or more out of the second network node 106 and one or more further second network nodes 106'.

This is done in situations wherein the second network node 106 and/or the one or more further second network nodes 106' do not store the information about the reception of an uplink synchronization signal, e.g. an USS, by default. Thereby, the second network node 106 and/or the one or more further second network nodes 106' may transmit the information to another node, e.g. the third node 108, upon request.

As previously mentioned, the second information may also comprise handover related information.

Action 305

In some embodiments, the first network node 104 receives, from the second network node 106 or the third network node 108, a request to establish the neighbour relation with at least one of the second network node 106 and the one or more second network nodes 106' based on the neighbour node determination performed based on the first information by the third network node 108.

When the first network node 104 receives the request from the second network nodes 106, the second network node 106 may have received the request from the third network node 208.

However, it should be understood that in some embodiments, the first network node 104 receives a notification that a neighbouring node, e.g. the second network node 106, has been identified. In such embodiments, the first network node 104 may decide to establish a neighbour relation with the identified neighbouring node, e.g. the second network node 106. The notification may be received from the third network node 108. Thus, in some embodiments, the first network node 104 receives the notification from the second network node 106 or the third network node 108.

This relates to Action 205 previously described.

Action 306

The first network node 104 establishes a neighbour relation with at least one of the second network node 106 and the one or more further second network nodes 106' based on a neighbour node determination performed by the third network node 108 based on the first information.

In some embodiments, by establishing a neighbour relation with the second network node 106 is meant that the first network node 104 possibly sets up a communications link 112 with the at least one of the second network node 106 and the one or more further second network nodes 106', and updates neighbour information with information relating to the at least one of the second network node 106 and the one or more further second network nodes 106'. For example, a Neighbour Relation Table (NRT) may be updated with information relating to the second network node 106. Further, the first network node 104 may set up the communication link 112 if a communication link is not already set up with the second network node 106. This may for example be the case when a beam neighbour relation is set up. Thus, the communication link 112 may be set up at the same time as the beam relation. However, it should be understood that the communication link 112 may be set up before the setup of the beam relation. Thus, the communication link 112 may be set up at a first point in time preceding a second point in time for the set of the beam relation.

The first network node 104 may also establish beam relations with the neighbour node 106. In some embodiments, by establishing a beam relation is meant that the beam identifiers are exchanged and stored in a neighbour relation table. For beam relation establishment, the first network node 104 and the second node 106 may need to relate the neighbour relations to appropriate beams. For example, if the first network node 104 has N1 downlink beams and the second network node 106 has N2 downlink beams, then upon neighbour relation establishment, the nodes 104,106 may identify that a particular beam (say beam number B1) from the first network node 104 should establish beam relations with beam B2 of the second network node 106. In order to do so, the nodes 104,106 may translate the USS reception in the uplink into an appropriate DL beam. In the case of a hybrid-based AMM procedure, this translation may be done straightforwardly for the second network node 106 as USS reception implicitly corresponds to a particular MRS transmission and hence a particular downlink beam.

This Action relates to Action 206 previously described.

Figure 4:
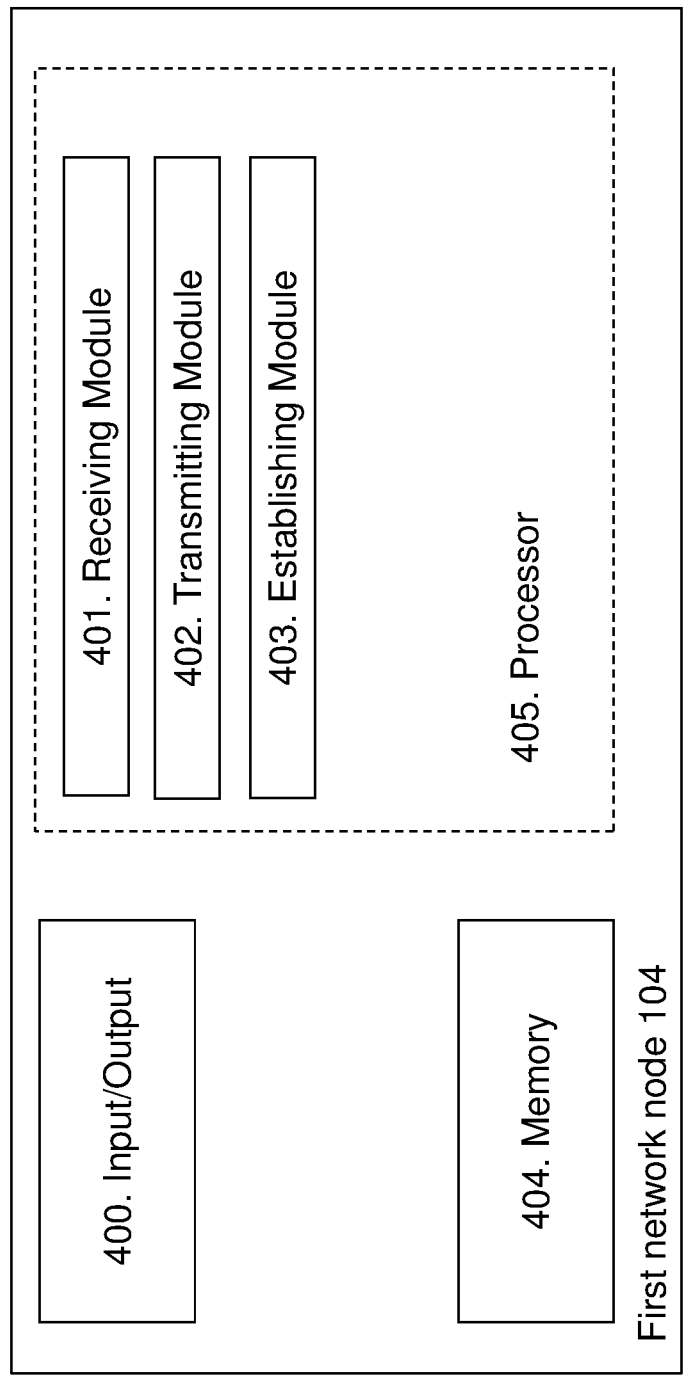
FIG. 4 is a schematic block diagram schematically illustrating embodiments of a first network node.

To perform the method for establishing a neighbour relation with the second network node 106,106', the first network node 104 may be configured according to an arrangement depicted in FIG. 4. As previously mentioned, the first network node 104 and the second network node 106,106' are operating in the wireless communications network 100.

The first network node 104 comprises an input and output interface 400 configured to communicate, with one or more network nodes, e.g. the second network node 106, the one or more further second network nodes 106', and/or the third network node 108, operating in the wireless communications network 100. The input and output interface 400 may comprise a wireless receiver (not shown) and a wireless transmitter (not shown).

The first network node 104 is configured to receive, e.g. by means of a receiving module 401 configured to receive, a transmission from the communications device 110 or from one or more network nodes, e.g. the second network node 106, the one or more further second network nodes 106', and/or the third network node 108, operating in the wireless communications network 100. The receiving module 401 may be implemented by or arranged in communication with a processor 405 of the first network node 104. The processor 405 will be described in more detail below.

The first network node 104 is configured to receive a reference signal, e.g. an uplink synchronisation signal, from the communications device 110 operating in the wireless communications network 100.

In some embodiment, the first network node 104 is configured to receive, from the third network node 108, a request to store the received uplink synchronisation signal and a first information. The first information relates to an identity of the received uplink synchronisation signal and to a first reception time of the uplink synchronisation signal.

The first network node 104 may be configured to receive, from the second network node 106 or the third network node 108, a request to establish the neighbour relation with the at least one of the second network node 106 and the one or more further second network nodes 106' based on the neighbour node determination performed based on the first information by the third network node 108.

However, it should be understood that in some embodiments, the first network node 104 is configured to receive a notification that a neighbouring node, e.g. the second network node 106, has been identified. In such embodiments, the first network node 104 may be configured to decide to establish a neighbour relation with the identified neighbouring node, e.g. the second network node 106. The notification may be received from the third network node 108. Thus, in some embodiments, the first network node 104 is configured to receive the notification from the second network node 106 or the third network node 108.

The first network node 104 is configured to transmit, e.g. by means of a transmitting module 402 configured to transmit, a transmission to the communications device 110 or to one or more network nodes, e.g. the second network node 106, the one or more further second network nodes 106', and/or the third network node 108, operating in the wireless communications network 100. The transmitting module 402 may be implemented by or arranged in communication with the processor 405 of the first network node 104.

In order to obtain a neighbour node determination, the first network node 104 is configured to transmit, to the third network node 108 operating in the wireless communications network 100, the first information.

The first network node 104 may transmit the first information when a signal strength of the received uplink synchronisation signal is above a threshold value. For example, the first network node 104 may transmit the first information when the signal strength is above −120 dBm.

In some embodiment, the first network node 104 is configured to transmit, to the third network node 108, a request to configure the second network node 106 and/or one or more further second network nodes 106' to store the uplink synchronisation signal when received by the second network node 106 or by the one or more further second network nodes 106' and to store a second information. The second information may relate to the identity of the received uplink synchronisation signal and to a second reception time of the received uplink synchronisation signal when received by the respective any one or more out of the second network node 106 and one or more further second network nodes 106'.

The first network node 104 is configured to establish, e.g. by means of an establishing module 403 configured to establish, a neighbour relation with the at least one of the second network node 106 and the one or more further second network nodes 106'. The establishing module 403 may be implemented by or arranged in communication with the processor 405 of the first network node 104.

The first network node 104 is configured to establish a neighbour relation with the at least one of the second network node 106 and the one or more further second network nodes 106' based on the neighbour node determination performed by the third network node 108 based on the first information.

However, as mentioned above and in some embodiments, the first network node 104 is configured to receive a notification that a neighbouring node, e.g. the second network node 106, has been identified. In such embodiments, the first network node 104 may be configured to establish a neighbour relation with the identified neighbouring node, e.g. the second network node 106.

In some embodiments, the first network node 104 is configured to establish the neighbour relation with the at least one of the second network node 106 and the one or more further second network nodes 106' by being configured to set up a communications link 112 with the at least one of the second network node 106 and the one or more further second network nodes 106'; and to update neighbour information with information relating to the at least one of the second network node 106 and the one or more further second network nodes 106'.

Further, the first network node 104 may be configured to establish beam relations. Thus, the first network node 104 may be configured to exchange information relating to one or more beam relations, e.g. one or more beam identifiers with one or more other network nodes, and to store one or more beam identifiers in a neighbouring relation table. The beam identifiers may be retrieved through a translation function that may be implemented as part of the processor 405. The translation function translates the USS reception into an appropriate downlink beam.

The first network node 104 may also comprise means for storing data. In some embodiments, the first network node 104 comprises a memory 404 configured to store the data. The data may be processed or non-processed data and/or information relating thereto. The memory 404 may comprise one or more memory units. Further, the memory 404 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the first network node 104.

Embodiments herein for establishing a neighbour relation with the second network node 106 may be implemented through one or more processors, such as the processor 405 in the arrangement depicted in FIG. 4, together with computer program code for performing the functions and/or method actions of embodiments herein. The program code mentioned above may also be provided as a computer program product, for instance in the form of a data carrier carrying computer program code for performing the embodiments herein when being loaded into the first network node 104. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the first network node 104.

Those skilled in the art will also appreciate that the input/output interface 400, the receiving module 401, the transmitting module 402, and the establishing module 403 above may refer to a combination of analog and digital circuits, and/or one or more processors configured with software and/or firmware, e.g. stored in the memory 404, that when executed by the one or more processors such as the processors in the first network node 104 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 5:
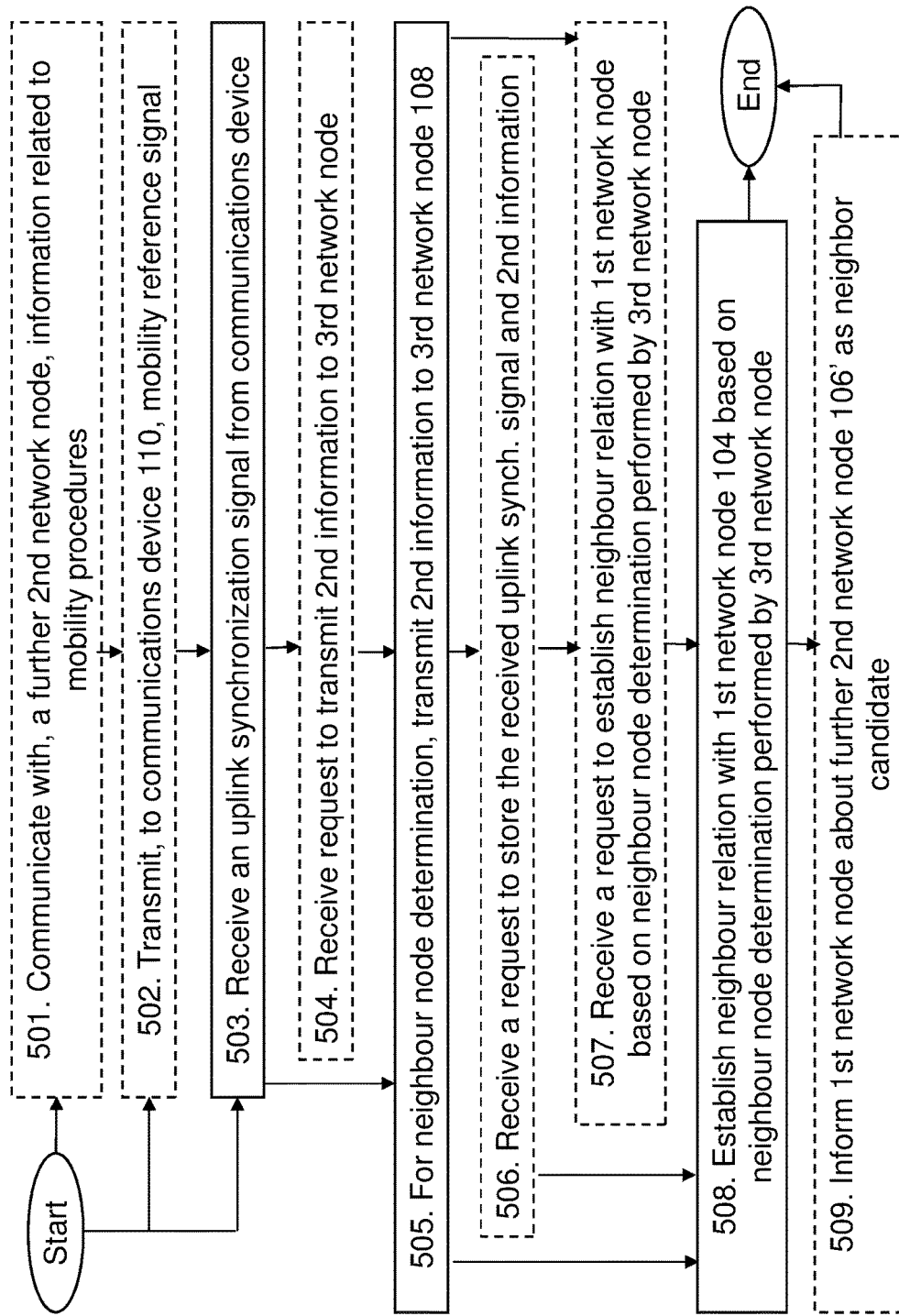
FIG. 5 is a flowchart schematically illustrating embodiments of a method performed by a second network node.

Examples of methods performed by the second network node 106 for establishing a neighbour relation with the first network node 104 will now be described with reference to the flowchart depicted in FIG. 5. As previously mentioned, the first network node 104 and the second network node 106 are operating in the wireless communications network 100. Further, as also previously mentioned, the neighbour relation may be a node neighbour relation or a beam neighbour relation, wherein the node neighbour relation relates to a relation between neighbouring nodes and the beam neighbour relation relates to a relation between neighbouring beams.

The methods comprise one or more of the following actions. It should be understood that the actions may be taken in any suitable order and that some actions may be combined. Actions that are optional are presented in dashed boxes in FIG. 6.

Action 501

In some embodiments, the second network node 106 communicates information relating to a mobility procedure with one or more out of the one or more further second network node 106'. This may be done in order to initiate a handover procedure. This communication may depend not only on the type of active mode mobility procedure, e.g. whether it is an uplink-based AMM procedure or a hybrid AMM procedure, but also on whether the second network node 106 is a source node or a target node of the handover (HO) procedure.

For example, in case of an uplink based AMM procedure and when the second network node 106 is the target node of the HO procedure, the second network node 106 may receive a message from one or more out of the one or more further second network node 106' indicating an USS configuration. Alternatively, in case of the uplink based AMM procedure and when the second network node 106 is the source node of the HO procedure, the second network node 106 may transmit a message to the one or more out of the one or more further second network node 106' indicating an USS configuration.

Furthermore, in case of a hybrid AMM procedure and when the second network node 106 is the source node in a HO procedure, the second network node 106 may transmit a request to one out of the one or more further second network node 106' to turn on one or more mobility beams. In response, the second network node 106 receives an MRS configuration and the corresponding USS mapping from the one out of the one or more further second network node 106'.

By the expression "turn on the mobility beam" when used in this disclosure is meant that the corresponding network node will transmit a mobility reference signal in the said beam.

Alternatively, in case of a hybrid AMM procedure and when the second network node is the target node in the HO procedure, the second network node 106 may receive a request from one out of the one or more further second network node 106' to turn on its mobility beams. In response, the second network node 106 transmits an MRS configuration and the corresponding USS mapping to the one out of the one or more further second network node 106'.

Action 502

This action may only be applicable in a hybrid AMM procedure, wherein the second network node 106, based on the communication done in action 501, transmits a mobility reference signal in order to facilitate the handover procedure.

Action 503

The second network node 106 receives the uplink synchronisation signal from the communications device 110. The uplink synchronisation signal may be transmitted when a radio link between the second network node 106 and the communications device 110 deteriorates.

In some embodiments, the second network node 106 receives the uplink synchronisation from the communications device 110 in response to the transmitted mobility reference signal.

Action 504

In some embodiments, the second network node 106 receives, from the third network node 108, a request to transmit to the third network node 108 a second information. As mentioned above, the second information relates to an identity of the uplink synchronisation signal and to a second reception time of the uplink synchronisation signal. Further, as also previously mentioned, the second information may comprise information related to the handover procedure.

The third network node 108 may request the second network node 106 to transmit an acknowledgement (ACK) if the second network node 106 has received the uplink synchronization signal at a point of time T, and a negative acknowledgement (NACK) if the second network node 106 has not received the uplink synchronization signal at a point of time T, respectively. Thus, sometimes in this disclosures, the second information is an ACK or a NACK, or the second information comprises an ACK or a NACK.

For example, the second information may comprise an ACK by means of which the second network node 106 acknowledges reception of the uplink synchronization signal at the point of time T. Thus, the second information, e.g. the ACK, relates to the identity of the uplink synchronization signal A and to the second reception time, e.g. to the point of time T.

As will be described in relation to for example Action 705 below, the second information may be used by the third network node 108 to determine neighbour relations.

Action 505

For neighbour node determination, the second network node 106 transmits, to the third network node 108 operating in the wireless communications network 100, the second information. Further, as mentioned above, the second information may be an ACK or a NACK or it may comprise an ACK or a NACK.

In some embodiments, the second network node 106 transmits the second information to the third network node 108 when a signal strength of the received uplink synchronisation signal is above a threshold value.

Action 506

In some embodiments, the second network node 106 receives, from the third network node 108, a request to store the received uplink synchronisation signal and the second information.

Thus, the second network node 106 may store information relating to one or more received uplink synchronisation signals and/or one or more reception times and possibly handover related information. The information may be transmitted to a network node, e.g. to the third network node 108, at a later point in time.

Action 507

In some embodiments, the second network node 106 receives, from the first network node 104 or the third network node 108, a request to establish the neighbour relation with the first network node 104 based on the neighbour node determination performed based on the second information by the third network node 108.

Thus, the second network node 106 is instructed to establish a neighbour relation with the first network node 104 when the performed neighbour node determination has determined the first and second network nodes 104, 106 as being neighbouring nodes. The second network node 106 may be directly instructed from the third network node 108 or indirectly instructed from the first network node 104 to establish the establish the neighbour relation with the first network node 104.

However, it should be understood that in some embodiments, the second network node 106 receives a notification that a neighbouring node, e.g. the first network node 104, has been identified. In such embodiments, the second network node 106 may decide to establish a neighbour relation with the identified neighbouring node, e.g. the first network node 104. The notification may be received from the third network node 108. Thus, in some embodiments, the second network node 106 receives the notification from the first network node 104 or the third network node 108.

Action 508

The second network node 106 establishes a neighbour relation with the first network node 104 based on the neighbour node determination performed, by the third network node 108, based on the second information.

In some embodiments, the second network node 106 establishes the neighbour relation with the first network node 104 by possibly setting up a communications link 112 with the first network node 104 and updating neighbour information with information relating to the first network node 104. In other words, the second network node 106 may set up the communication link 112 if a communication link is not already set up with the first network node 104.

In other words, the second network node 106 may set up the communication link 112 if a communication link is not already set up with the first network node 104. This may for example be the case when a beam neighbour relation is set up. Thus, the communication link 112 may be set up at the same time as the beam relation. However, it should be understood that the communication link 112 may be set up before the setup of the beam relation. Thus, the communication link 112 may be set up at a first point in time preceding a second point in time for the set of the beam relation.

The second network node 106 may also establish beam neighbour relations. In some embodiments, by establishing a beam relation is meant that one or more beam identifiers are exchanged with one or more other network nodes and stored in a neighbour relation table. Thus, the second network node 106 may exchange and store one or more beam identifiers in a neighbour relation table.

This Action relates to Action 206 previously described.

Action 509

In some embodiment, for example when a hybrid based AMM procedure is used, the second network node 106 may inform the first network node 104 about one out of the one or more further second network node 106' as being a neighbour candidate to the first network node 104. For instance, imagine a case wherein the hybrid AMM procedure is used and assume that the second network node 106 is the target node for a HO procedure. Then, the USS transmission from the communications device 110 may be heard by the first network node 104 and the second network node 106, but not by the one out of the one or more further second node 106' as it is not configured to listen for that particular USS. Therefore, since the HO procedure is initiated from the one out of the one or more further second network node 106', this node is also a possible neighbour node of the first network node 104. Thus, the second network node 106 informs the first network node 104 and acts as a relay for neighbour relation establishment between the one out of the one or more further second network node 106' and the first network node 104.

Figure 6:
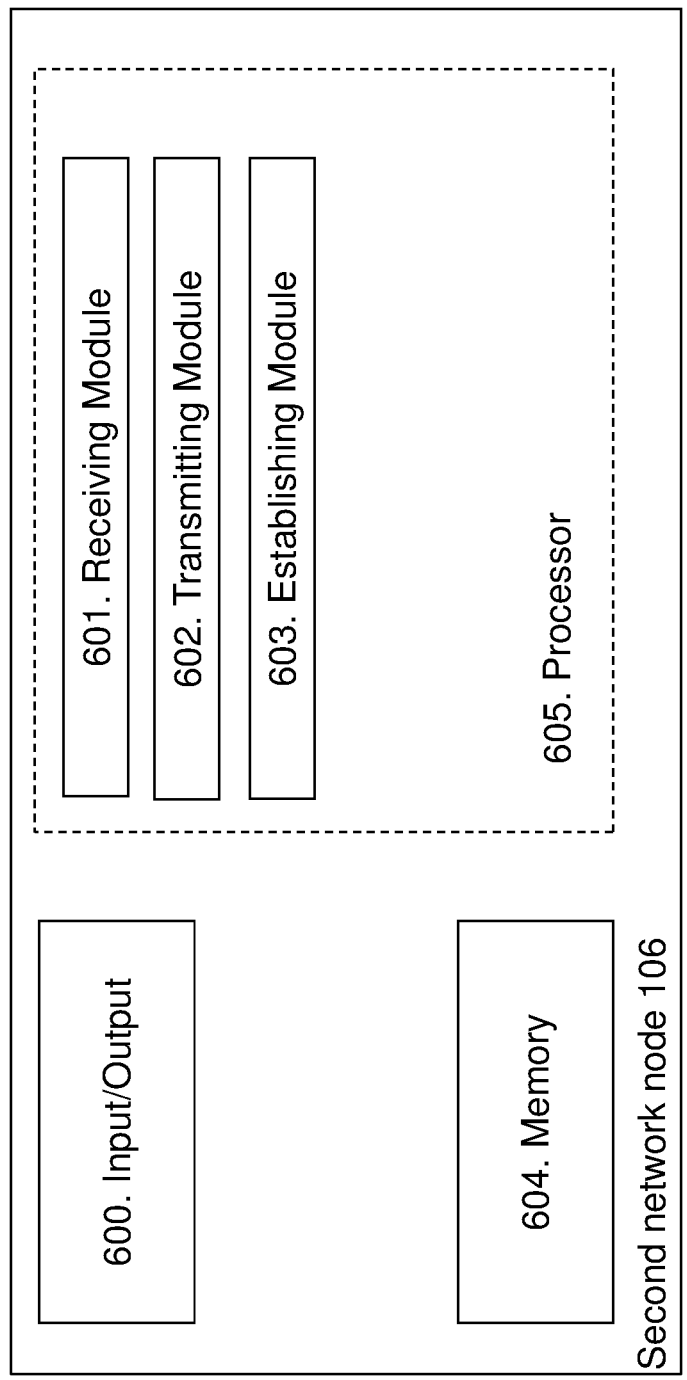
FIG. 6 is a schematic block diagram schematically illustrating embodiments of a second network node.

To perform the method for establishing a neighbour relation with the first network node 104, the second network node 106 may be configured according to an arrangement depicted in FIG. 6. As previously mentioned, the first network node 104 and the second network node 106 are operating in the wireless communications network 100.

The second network node 106 comprises an input and output interface 600 configured to communicate, with one or more network nodes, e.g. the first network node 104, the one or more further second network nodes 106, and/or the third network node 108, operating in the wireless communications network 100. The input and output interface 700 may comprise a wireless receiver (not shown) and a wireless transmitter (not shown).

The second network node 106 is configured to receive, e.g. by means of a receiving module 601 configured to receive, a transmission from the communications device 110 or from one or more network nodes, e.g. the first network node 104, the one or more further second network nodes 106', and/or the third network node 108, operating in the wireless communications network 100. The receiving module 601 may be implemented by or arranged in communication with a processor 605 of the second network node 106. The processor 605 will be described in more detail below.

The second network node 106 is configured to receive an uplink synchronisation signal from the communications device 110 operating in the wireless communications network 100.

In some embodiment, the second network node 106 is configured to receive, from the third network node 108, a request to store the received uplink synchronisation signal and the second information. Thus, the second network node 106 may be configured to store information relating to one or more received uplink synchronisation signals, and/or one or more reception times.

Further, the second network node 106 may receive, from the third network node 108, a request to transmit the second information to the third network node 108.

The second network node 106 may receive, from the first network node 104 or the third network node 108, a request to establish the neighbour relation with the first network node 104 based on the neighbour node determination performed by the third network node 108 based on the second information. As previously mentioned, the second information relates to an identity of the received uplink synchronisation signal and to a second reception time of the uplink synchronisation signal. The second reception time is the point of time the second network node 106 received the uplink synchronisation signal.

In some embodiments, wherein the second network node 106 is configured to transmit a mobility reference signal to the communications device 110, the second network node 106 may be configured to receive the uplink synchronisation signal in response to the transmitted mobility reference signal.

Further, the second network node 106 may be configured to communicate with one of the one or more further second network nodes 106' information relating to a mobility procedure. For example, the second network node 106 may be configured to communicate with the one out of the one or more further second network nodes 106 in order to exchange information about a mobility reference signal configuration. Thus, in such embodiments, the second network node 106 may be configured to receive and/or to transmit the mobility reference signal configuration to/from the one or more of the one or more further second network nodes 106'. Further, it should be understood that in such embodiments, the second network node 106 has a neighbour relation with the further second network node 106' transmitting the configuration.

The second network node 106 is configured to transmit, e.g. by means of a transmitting module 602 configured to transmit, a transmission to the communications device 110 or to one or more network nodes, e.g. the first network node 104, the one or more further second network nodes 106', and/or the third network node 108, operating in the wireless communications network 100. The transmitting module 602 may be implemented by or arranged in communication with the processor 605 of the second network node 106.

In order to obtain a neighbour node determination, the second network node 106 is configured to transmit, to the third network node 108 operating in the wireless communications network 100, the second information. The second network node 106 may transmit the second information when a signal strength of the received uplink synchronisation signal is above a threshold value.

The second network node 106 may be configured to transmit, to the communications device 110, a mobility reference signal.

In some embodiments wherein the second network node 106 has received a configuration of the mobility reference signal from one of the one or more further second network nodes 106', the second network node 106 may be configured to transmit the mobility reference signal in accordance with the received configuration.

Further, as previously mentioned, the second network node 106 may be configured to communicate with one of the one or more further second network nodes 106' in order to exchange information about the mobility reference signal configuration. Thus, in such embodiments, the second network node 106 may be configured to receive and/or to transmit the mobility reference signal configuration to/from the one or more of the one or more further second network nodes 106'. As also previously described, in such embodiments, the second network node 106 has already a neighbour relation with the further second network node 106' transmitting the configuration.

Further, when the second network node 106 as received, from one of the one or more further network nodes 106', a request to turn on one or more mobility beams, the second network node 106 may be configured to transmit a mobility reference signal configuration and a corresponding uplink synchronisation signal mapping to the one or more second network nodes 106'.

The second network node 106 is configured to establish, e.g. by means of an establishing module 603 configured to establish, a neighbour relation with the first network node 104 and possibly with one or more further second network nodes 106' to which one or more further second network node 106' the second network node 106 not already has a neighbour relation. The establishing module 603 may be implemented by or arranged in communication with the processor 605 of the second network node 106.

The second network node 106 is configured to establish a neighbour relation with the first network node 104 based on a neighbour node determination performed by the third network node 108 based on the second information.

In some embodiments, the second network node 106 is configured to establish the neighbour relation with the first network node 104 by being configured to set up a communications link 112 with the first network node 104 and to update neighbour information with information relating to the first network node 104.

Further, the second network node 106 may be configured to establish beam relations. Thus, the second network node 106 may be configured to exchange and store one or more beam identifiers in a neighbour relation table. Further, the second network node 106 may be configured to establish the beam relations with the help of a translation function that maps the USS reception into appropriate DL beam.

The second network node 106 may also comprise means for storing data. In some embodiments, the second network node 106 comprises a memory 604 configured to store the data. The data may be processed or non-processed data and/or information relating thereto. The memory 604 may comprise one or more memory units. Further, the memory 604 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the second network node 106.

Embodiments herein for establishing a neighbour relation with the first network node 104 may be implemented through one or more processors, such as the processor 605 in the arrangement depicted in FIG. 6, together with computer program code for performing the functions and/or method actions of embodiments herein. The program code mentioned above may also be provided as a computer program product, for instance in the form of a data carrier carrying computer program code for performing the embodiments herein when being loaded into the second network node 106. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the second network node 106.

Those skilled in the art will also appreciate that the input/output interface 600, the receiving module 601, the transmitting module 602, and the establishing module 603 above may refer to a combination of analog and digital circuits, and/or one or more processors configured with software and/or firmware, e.g. stored in the memory 604, that when executed by the one or more processors such as the processors in the second network node 106 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 7:
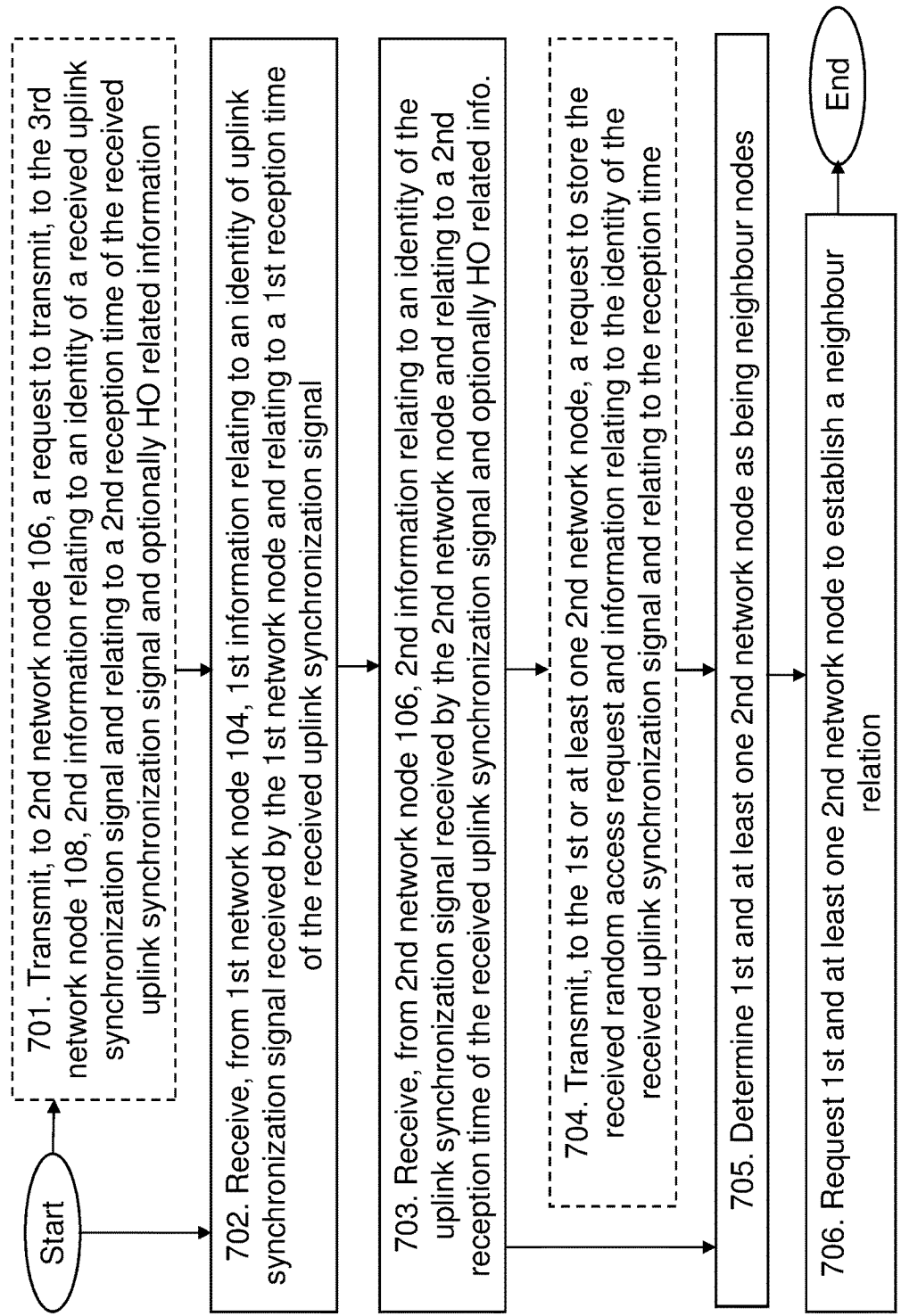
FIG. 7 is a flowchart schematically illustrating embodiments of a method performed by a third network node.

Examples of methods performed by the third network node 108 for requesting establishment of a neighbour relation between the first network node 104 and the second network node 106,106' will now be described with reference to the flowchart depicted in FIG. 7. As previously mentioned, the first network node 104, the second network node 106,106' and the third network node 108 are operating in the wireless communications network 100. Further, as also previously mentioned, the neighbour relation may be a node neighbour relation or a beam neighbour relation, wherein the node neighbour relation relates to a relation between neighbouring nodes and the beam neighbour relation relates to a relation between neighbouring beams.

The methods comprise one or more of the following actions. It should be understood that the actions may be taken in any suitable order and that some actions may be combined. Actions that are optional are presented in dashed boxes in FIG. 7.

Action 701

In some embodiments, the third network node 108 transmits, to at least one of the second network node 106 and one or more further second network nodes 106', a request to transmit to the third network node 108 the second information. As previously mentioned, the second information relates to an identity of the received uplink synchronisation signal and to a second reception time of the uplink synchronisation signal and optionally also to information related to a handover procedure. However, the second information may be an ACK or a NACK or it may comprise an ACK or a NACK. Thus, sometimes in this disclosures, the second information is an ACK or a NACK, or the second information comprises an ACK or a NACK. For example, the second information may comprise an ACK by means of which the second network node 106 acknowledges reception of the uplink synchronization signal at the point of time T. Thus, the second information, e.g. the ACK, relates to the identity of the uplink synchronization signal and to the second reception time, e.g. to the point of time T.

The third network node 108 may be triggered by the first network node 104 to transmit the request to the second network node 106.

The third network node 108 may request the second network node 106 to transmit an ACK if the second network node 106 has received the uplink synchronization signal at a point of time T, and a NACK if the second network node 106 has not received the uplink synchronization signal at a point of time T, respectively.

Additionally or alternatively, the third network node 108 may transmit, to the first network node 104, a request to transmit to the third network node 108 the first information.

Action 702

The third network node 108 receives, from the first network node 104, a first information, which first information relates to an identity of the uplink synchronisation signal received by the first network node 104 and to a first reception time of the received uplink synchronisation signal.

This Action relates to Actions 201 and 301 previously described.

Action 703

The third network node 108 receives, from the at least one of the second network node 106 and the one or more further second network nodes 106', a second information, which second information relates to the identity of the uplink synchronisation signal received by the at least one of the second network node 106 and the one or more further second network nodes 106', and to a second reception time of the received uplink synchronisation signal and optionally also to information related to a handover procedure.

This Action relates to Actions 201 and 503 previously described.

Action 704

In some embodiments, the third network node 108 transmits, to the first network node 104 and/or to the at least one of the second network node 106 and the one or more further second network nodes 106', a request to store the received uplink synchronisation signal and information relating to the identity of the received uplink synchronisation signal and relating to the reception time of the uplink synchronisation signal and optionally also to information related to the handover procedure.

The third network node 108 may transmit the request to store the received uplink synchronisation signal and information in response to an indication received from a network node, e.g. the first network node 104 and/or the second network node 106. The indication indicates that the network node needs other network nodes, for example network nodes geographically close, to store the received uplink synchronisation signal and information. For example, the third network node 108 may transmit the request to store the received the uplink synchronization signal and information to the second network node 106 in response to an indication received from the first network node 104, which indication indicates that the first network node 104 needs one or more other network nodes, e.g. the second network node 106, to store the uplink synchronization signal and information, and vice versa.

This Action relates to Actions 303 and 506 previously described.

Action 705

The third network node 108 determines the first network node 104 and the at least one of the second network node 106 and the one or more further second network nodes 106' as being neighbour nodes based on the first information and the second information.

In some embodiments, the third network node 108 determines the first network node 104 and the at least one of the second network node 106 and the one or more further second network nodes 106' as being neighbour nodes by determining that the first and second information relate to the same identity of the received uplink synchronisation signal, and by determining that the first and second reception times are equal or almost equal. By the expression "almost equal reception times" is meant that the difference between the first and second reception times is within a desired threshold value. For example, the first and second reception times should be so close to each other that the difference in time corresponds to the different distances of the propagation paths from the communications device 110 to the first network node 104 and from the communications device 110 to the one or more second network nodes 106, 106' respectively. In other words, almost equal reception times means that the time difference is at a magnitude corresponding to the difference in time of arrival of the signal from the communications device 110 to the first network node 104 and the one or more second network nodes 106, 106' respectively.

The third network node 108, in some embodiments, may further determine the first network node 104 and a further second node 106' as being neighbour nodes by using the information obtained from the second network node 106 regarding handover procedure.

This Action relates to Actions 204 and 309 previously described.

Action 706

The third network node 108 requests the first network node 104 and/or the at least one of the second network node 106 and the one or more further second network nodes 106' to establish a neighbour relation.

This Action relates to Actions 205, 305, 507 and 509 previously described.

Figure 8:
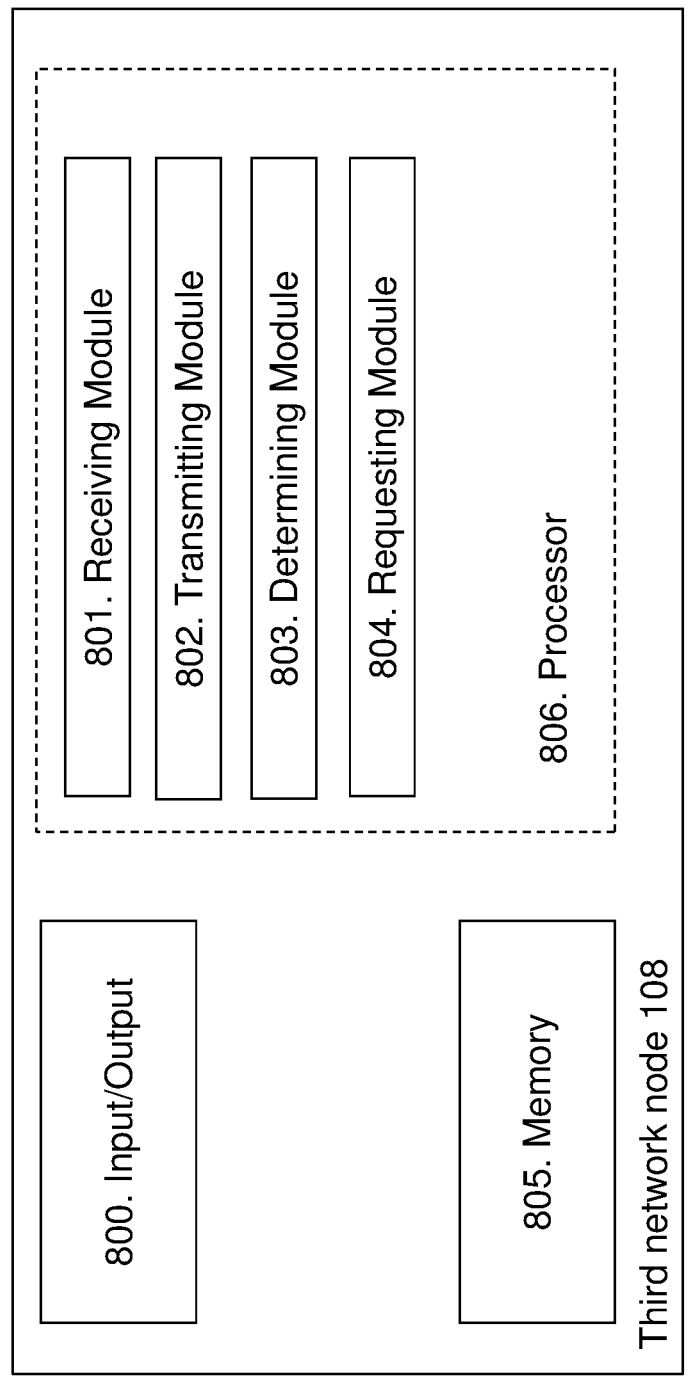
FIG. 8 is a schematic block diagram schematically illustrating embodiments of a third network node.

To perform the method for requesting establishment of a neighbour relation between the first network node 104 and the second network node 106,106', the third network node 108 may be configured according to an arrangement depicted in FIG. 8. As previously mentioned, the first network node 104, the second network node 106,106' and the third network node 108 are operating in the wireless communications network 100.

The third network node 108 comprises an input and output interface 800 configured to communicate, with one or more network nodes, e.g. the first network node 104, the second network node 106, the one or more further second network nodes 106', and/or with the communications device 110, operating in the wireless communications network 100. The input and output interface 800 may comprise a wireless receiver (not shown) and a wireless transmitter (not shown).

The third network node 108 is configured to receive, e.g. by means of a receiving module 801 configured to receive, a transmission from the communications device 110 or from one or more network nodes, e.g. the first network node 104, the second network node 106 and/or the one or more further second network nodes 106' operating in the wireless communications network 100. The receiving module 901 may be implemented by or arranged in communication with a processor 806 of the third network node 108. The processor 806 will be described in more detail below.

The third network node 108 is configured to receive, from the first network node 104, a first information. The first information relates to an identity of the uplink synchronisation signal received by the first network node 104 and to a first reception time of the received uplink synchronisation signal.

Further, the third network node 108 is configured to receive, from the at least one of the second network node 106 and the one or more further second network nodes 106', a second information. The second information relates to the identity of the received uplink synchronisation signal and to a second reception time of the received uplink synchronisation signal and optionally also to handover related information.

The third network node 108 is configured to transmit, e.g. by means of a transmitting module 802 configured to transmit, a transmission to the communications device 110 or to one or more network nodes, e.g. the first network node 104, the second network node 106 and/or the one or more further second network nodes 106' operating in the wireless communications network 100. The transmitting module 802 may be implemented by or arranged in communication with the processor 806 of the third network node 108.

In some embodiments, the third network node 108 is configured to transmit, to the first network node 104 and/or the at least one of the second network node 106 and the one or more further second network nodes 106', a request to store the received uplink synchronisation signal and information relating to the identity of received uplink synchronisation signal and relating to the reception time of the uplink synchronisation signal and optionally also to information related to the handover whenever applicable.

The third network node 108 may be configured to transmit, to the at least one of the second network node 106 and the one or more further second network nodes 106', a request to transmit to the third network node 108 the second information.

Additionally or alternatively, the third network node 108 may be configured to transmit, to the first network node 104, a request to transmit to the third network node 108 the first information.

The third network node 108 is configured to determine, e.g. by means of a determining module 803 configured to determine, two or more network nodes, e.g. two or more out of the first network node 104, the second network node 106 and/or the one or more further second network nodes 106', as being neighbour nodes. The determining module 803 may be implemented by or arranged in communication with the processor 806 of the third network node 108.

The third network node 108 is configured to determine the first network node 104 and at least one of the second network node 106 and the one or more further second network nodes 106' as being neighbour nodes.

In some embodiments, the third network node 108 is configured to determine the first network node 104 and the at least one of the second network node 106 and the one or more further second network nodes 106' as being neighbour nodes by being configured to determine that the first and second information relate to the same identity of the received uplink synchronisation signal; and determine that the first and second reception times are equal or almost equal.

In some further embodiments, the third network node 108 is configured to determine the first network node 104 and one of the one or more further second network node 106' as being neighbour nodes by being configured to determine that the first and second information relate to the same identity of the received uplink synchronisation signal; determine that the first and second reception times are equal or almost equal; and/or by being configured to use handover related information of the second information.

The third network node 108 is configured to request, e.g. by means of a requesting module 804 configured to request, establishment of a neighbour relation. The requesting module 804 may be implemented by or arranged in communication with the processor 806 of the third network node 108.

The third network node 108 is configured to request the first network node 104 and/or the at least one of the second network node 106 and the one or more further second network nodes 106' to establish a neighbour relation.

The third network node 108 may also comprise means for storing data. In some embodiments, the third network node 108 comprises a memory 805 configured to store the data. The data may be processed or non-processed data and/or information relating thereto. The memory 805 may comprise one or more memory units. Further, the memory 805 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the third network node 108.

Embodiments herein for establishing a neighbour relation between the first network node 104 and the second network node 106,106' may be implemented through one or more processors, such as the processor 806 in the arrangement depicted in FIG. 8, together with computer program code for performing the functions and/or method actions of embodiments herein. The program code mentioned above may also be provided as a computer program product, for instance in the form of a data carrier carrying computer program code for performing the embodiments herein when being loaded into the third network node 108. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the third network node 108.

Those skilled in the art will also appreciate that the input/output interface 800, the receiving module 801, the transmitting module 802, the determining module 804 and the requesting module 804 above may refer to a combination of analog and digital circuits, and/or one or more processors configured with software and/or firmware, e.g. stored in the memory 805, that when executed by the one or more processors such as the processors in the third network node 108 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Some Exemplifying Embodiments

In the description below some further exemplifying embodiments will be described. It should be understood that embodiments may be combined in any suitable manner and that features given in embodiments below may be combined with the disclosure above relating to embodiments of the first network node 104, the second network node 106, and the third network node 108, respectively.

Some First Exemplifying Embodiments Comprising Uplink Based Active Mode Mobility (AMM)

Figure 9:
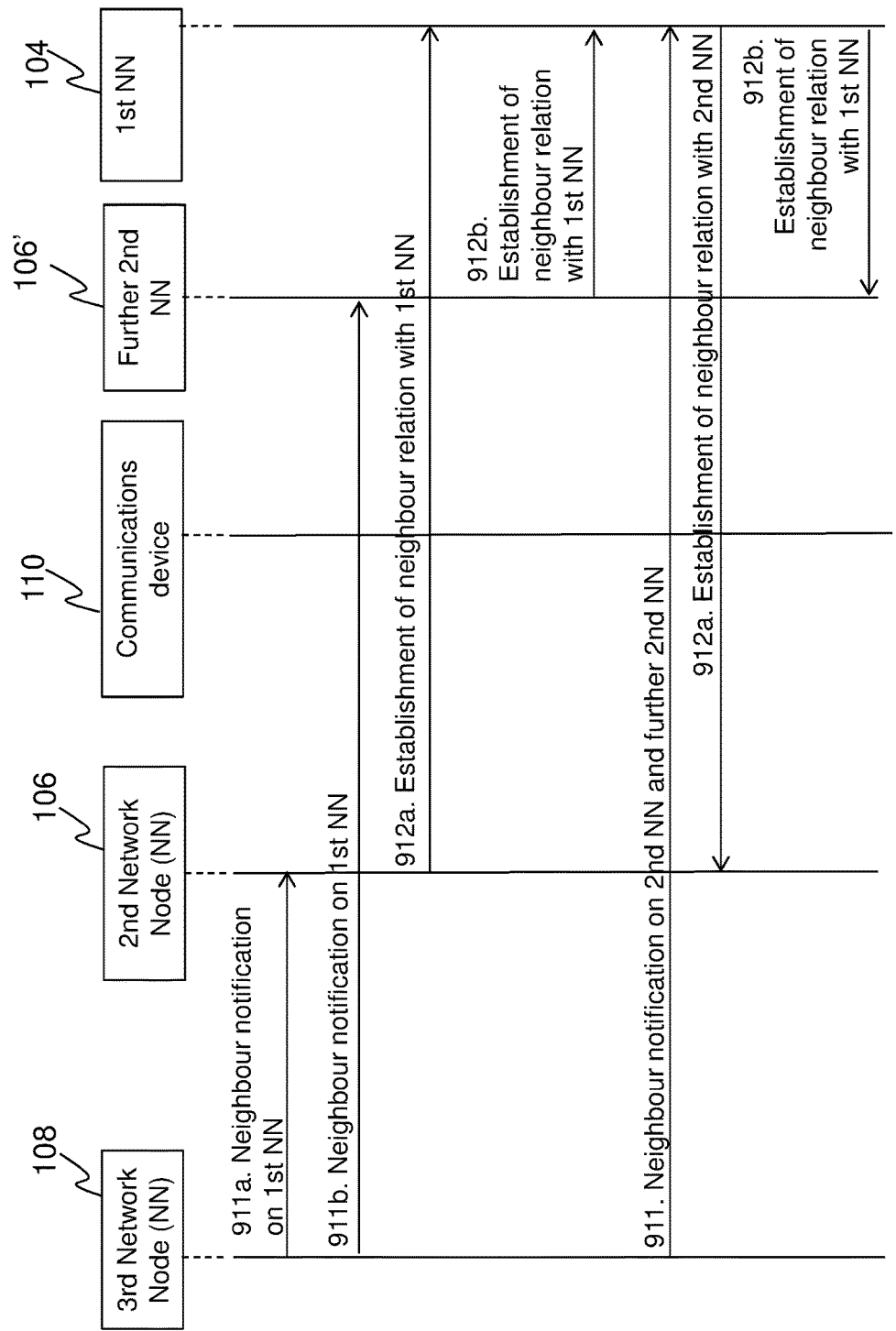
FIG. 9 is a schematic combined flowchart and signalling scheme of some first embodiments of a wireless communications network relating to uplink based AMM.

FIG. 9 is a schematic combined flowchart and signalling scheme of some first embodiments of a wireless communications network 100 comprising uplink based AMM.

In the description of FIG. 9, the second network node 106 is a source node in the handover procedure and hence it is sometimes referred to as a serving node, and the one or more further second network nodes 106' is referred to as target nodes since it is the target node in the handover procedure. However, it should be understood that the second network node 106 may be a target node in a handover procedure and that one out of the one or more further second network nodes 106' may be the source node, e.g. a serving node, in the handover procedure.

The target node is a known neighbouring node to the serving node, e.g. the second network node 106. Further, the first network node 104 is a new node, e.g. a newly deployed node.

In this disclosure, the term "third network node" should be understood to refer to a node that is capable of tracking and extracting the information about the nodes that are able to hear the reception of USS with a given ID at a given time.

Actions used in some embodiments for uplink based AMM solutions are further explained below. It should be understood that one or more actions may be optional, that actions may be taken in another suitable order and that actions may be combined.

Action 901. The third network node 108 may configure a newly deployed node, e.g. the first network node 104, and/or a set of existing nodes, e.g. the second network nodes 106,106', in the vicinity of the first network node 104, to store a received USS and a corresponding time stamp, e.g. a corresponding reception time, of receiving it. This Action relates to Actions 304, 506 and 701 previously described.

Action 902. Active mode mobility is triggered. This may be triggered by either the communications device 110 or the serving node, e.g. the second network node 106. In this action, the second network node 106 also informs its neighbouring node, e.g. the one or more further second network nodes 106', about this in order to prepare them for the upcoming USS transmission from the communications device 110.

Action 903. The serving node, e.g. the second network node 106, informs the communications device 110 about the USS configuration. This Action relates to Action 502 previously described.

Action 904. The communications device 110 performs the USS transmission. This transmission is heard by the serving node, e.g. the second network node 106, the one or more target nodes, e.g. the one or more further network nodes 106', and by the new node, e.g. the first network node 104. This Action relates to Action 503 previously described.

Action 905. The first network node 104 and the existing nodes, e.g. the second network node 106 and/or one or more further second network nodes 106', store the reception of the respective USS. This may comprise USS ID and possibly the reception time T. It is worth noting that even though the same notation T for the reception time of the USS are used for all the nodes involved, the reception time might not be exactly identical in the different nodes due to propagation properties. Thus, the reception time T is to be considered as a rough reception time of the USS that may vary slightly between the different nodes. By the term "slightly" when used herein is meant that the receptions times T of the different nodes Are almost equal, e.g. that the difference between two reception times is within a desired threshold value. This Action relates to Actions 303 and 506 previously described.

Action 906. The first network node 104 sends a report, e.g. a generated report, to the third network node 108, that is capable of identifying the other node/s, e.g. the second network node 106 and/or one or more further second network nodes 106', that was/were able to hear the USS at the mentioned reception time T. This Action relates to Action 302 previously described.

Action 907. A mobility decision may be taken. This action is done in further sub-actions comprising: (i) One or more further second network nodes 106' send the USS signal strength to the serving node, e.g. the second network node 106. (ii) The second network node 106 then determines the best node, e.g. one of the one or more further second network nodes 106'. (iii) Then the communications device 110 is handed over to the one of the one or more further second network nodes 106'.

Action 908. The one of the one or more further second network nodes 106' responds to the communications device 110 with a random access response message to inform the communications device 110 about a hand-over grant.

Action 909. The third network node 108 requests other nodes, e.g. the second network node 106 and/or the one or more further second network nodes 106', located in the vicinity, either geographically or in terms of radio link quality, of the first network node 104 to transmit information of received USSs in order to identify the respective USS reception at time T. This Action relates to Action 701 previously described.

Action 910. In Action 910a the second network node 106 that received the USS at reception time T transmits an acknowledgement of the reception to the third network node 108. In Action 910b the one or more further second network nodes 106', which one or more nodes received the USS at reception time T transmit an acknowledgement of the reception to the third network node 108. This Action relates to Action 505 previously described.

Action 911. In Action 911a the third network node 108 informs the second network node 106 and/or one or more of the further second network nodes 106' about the presence of the first network node 104. Alternatively or additionally, in Action 911b the third network node 108 informs the first node 104 about the presence of the second network node 106 and/or the one or more of the further second network nodes 106'. This Action relates to Actions 205, 305, 507 and 706 previously described.

Action 912. In Action 912a, the second network node 106 and the first network node 104 establish a neighbour node relation with each other. The process may be initiated by the second network node 106 or by the first network node 104. Alternatively or additionally, in Action 912b, the one or more further second network nodes 106' and the first network node 104 establish a neighbour node relation with each other. The process may be initiated by the one or more further second network nodes 106' or by the first network node 104. This Action relates to Actions 306 and 508 previously described.

Some Second Exemplifying Embodiments Comprising Hybrid Based Active Mode Mobility (AMM)

Figure 10:
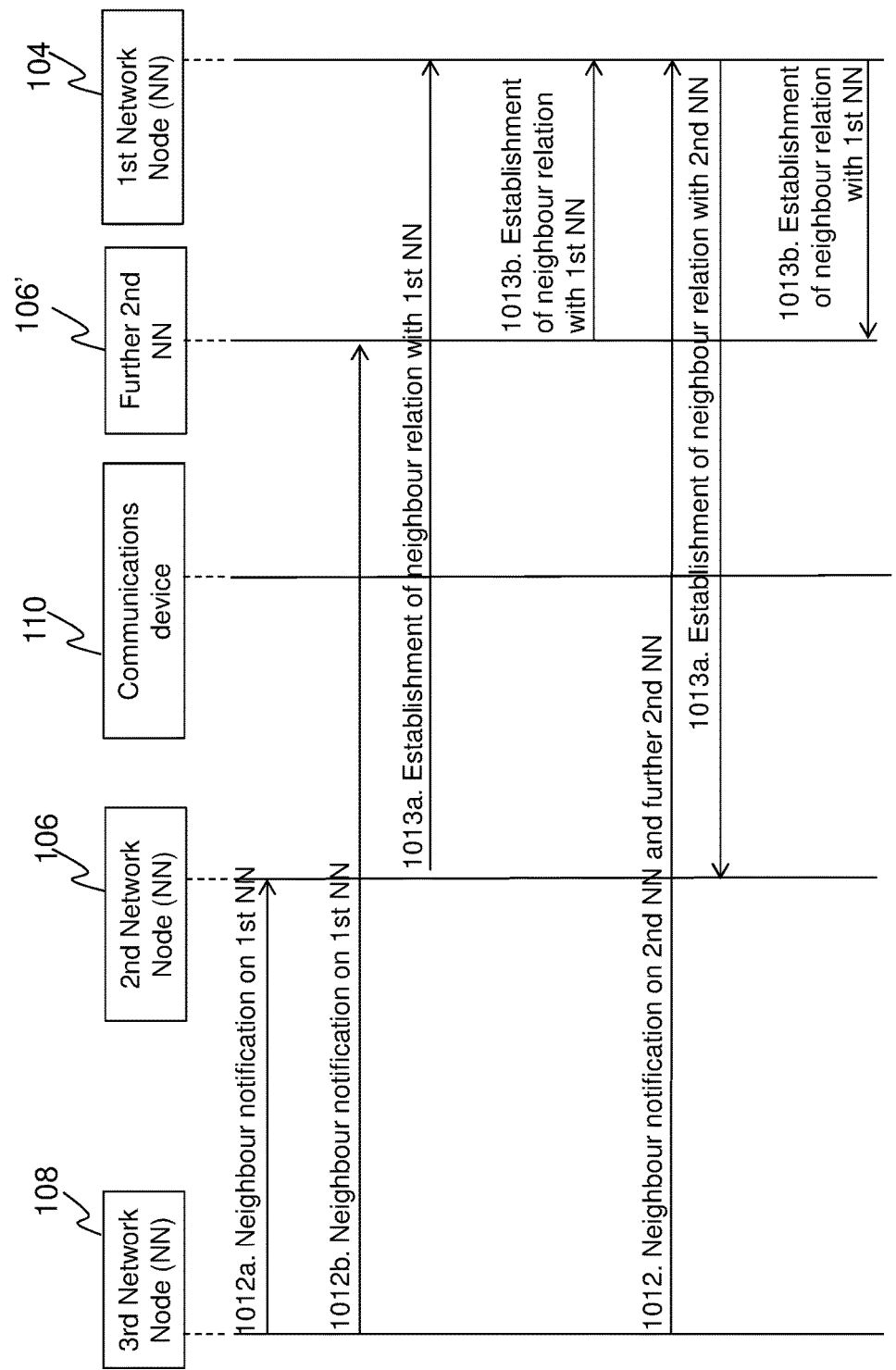
FIG. 10 is a schematic combined flowchart and signalling scheme of some second embodiments of a wireless communications network relating to hybrid based AMM.

FIG. 10 is a schematic combined flowchart and signalling scheme of some first embodiments of a wireless communications network 100 comprising hybrid based AMM.

In the description of FIG. 10, the second network node 106 is the source node in the handover procedure and hence it is sometimes referred to as a serving node, and the one or more further second network nodes 106' is referred to as target nodes since it is the target node in the handover procedure. The target node is a known neighbouring node to the serving node, e.g. the second network node 106. However, it should be understood that the second network node 106 may be a target node in a handover procedure and that one out of the one or more further second network nodes 106' may be the source node, e.g. a serving node, in the handover procedure. Further, the first network node 104 is a new node, e.g. a newly deployed node.

Actions used in some embodiments for hybrid based AMM solutions are further explained below. It should be understood that one or more actions may be optional, that actions may be taken in another suitable order and that actions may be combined.

Action 1001. The third network node 108 may configure a newly deployed node, e.g. the first network node 104, and/or a set of existing nodes, e.g. the second network nodes 106,106', in the vicinity of the first network node 104, to store a received USS and a corresponding time stamp, e.g.

a corresponding reception time, of receiving it and also information related to handover. This relates to Action 701 described above.

Action 1002. Active mode mobility is triggered. This may be triggered by either the communications device 110 or the serving node, e.g. the second network node 106. In this Action, the second network node 106 may also determine the candidate beams and informs its neighbouring node, e.g. one or more of the one or more further second network nodes 106', about this in order to prepare them for the transmission of MRS for the candidate beams. Note that in this scheme, there is one USS transmission reserved for each MRS.

Action 1003. The second network node 106 informs the communications device 110 about the USS and the MRS configurations. This relates to Action 502 described above.

Action 1004. MRS is transmitted for the candidate beams. That is MRSs may be transmitted from the second network node 106 and from one or more of the one or more further second network nodes 106'. This relates to Action 503 described above.

Action 1005. The communications device 110 measures the MRS strength of the received candidate beams.

Action 1006. The communications device 110 may detect the strongest MRS and does the corresponding USS transmission. In FIG. 10 two such transmissions are illustrated. In Action 1006 the communications device 110 transmits a USS-A to the further second network node 106' in response to a MRS transmitted from the further second network node 106'. The USS-A is also heard by the first network node 104. This relates to Actions 201, 301 and 503 previously described.

Action 1007. The first network node 104, the further second network node 106' may store the reception of the received USS-A. For example, comprising the respective USS ID and possibly their corresponding reception time, T-A. The further second network node 106' also may store handover related information. This relates to Actions 303 and 506 previously described.

Action 1008. The first network node 104 sends a generated report to the third network node 108 that is capable of identifying the other node/s that was/were able to hear the USS transmissions at the mentioned time stamps. This relates to Action 302 previously described.

Action 1009. The mobility decision is taken. This action is done in further sub-actions comprising: (i) The one or more further second network nodes 106' informs the second network node 106 about the reception of USS, indicating that it is the target node for handover. (ii) Then the communications device 110 is handed over to the one of the one or more second network nodes 106'.

Action 1010. The third network node 108 requests other nodes, e.g. the second network node 106 or one or more of the one or more further second network nodes 106', located in the vicinity, either geographically or in terms of radio link quality, of the first network node 104 to transmit information of received USSs in order to identify the USS receptions at given time stamps. This relates to Action 701.

Action 1011. One or more of the one or more further second network nodes 106' that received USS-A at reception time T-A transmits, to the third network node 108, an acknowledgement of the reception of the USS-A transmission at the time T-A along with further information related to handover procedure. This relates to Action 505 previously described.

Action 1012. In Action 1012 the third network node 108 informs the first node 104 about the presence of the second network node 106 and/or the one or more of the further second network nodes 106'. Alternatively or additionally, in Action 1012a the third network node 108 informs the second network node 106 about the presence of the first network node 104. Alternatively or additionally, in Action 1012b the third network node 108 informs one or more of the one or more further second network nodes 106' about the presence of the first network node 104. This relates to Actions 205 and 706 previously described.

Action 1013. In Action 1013a, the second network node 106 and the first network node 104 establish a neighbour node relation with each other. The process may be initiated by the second network node 106 or by the first network node 104. Alternatively or additionally, in Action 1013b, the one or more further second network nodes 106' and the first network node 104 establish a neighbour node relation with each other. The process may be initiated by the one or more further second network nodes 106' or by the first network node 104. This relates to Actions 206, 305 and 508 previously described.

Some Further Exemplifying Embodiments

In some embodiments, the first network node 104 only sends the report to the third network node 108 if the signal strength(s) of the received USS transmission is above a desirable threshold value. For example, the first network node 104 may transmit the report when the signal strength of the received USS is above −120 dBm.

In some embodiments, and when the position of the communications device 110 transmitting the USS is known, the neighbour relation table is updated using the position information. More precisely, since the current ANR table of the existing nodes, e.g. the second network node 106 and one or more of the one or more further second network nodes 106', are already known for that position, it is only needed to add the newly deployed node, e.g. the first network node 104, to the list. This may be done by one of the known nodes, e.g. the second network node 106 and one or more of the one or more further second network nodes 106', which network node 106, 106' contacts the first network node 104 and updates the ANR tables of all involved nodes.

In some embodiments, the third network node 108 pre-configures all the nodes, e.g. the second network node 106 and one or more of the one or more further second network nodes 106', to always store and report the heard USS transmissions in the communications network 100. In such an embodiment, Action 901 of the uplink based solution and Action 1001 of the hybrid based solution are unnecessary as the second node 106 and the first node 104 are already instructed to store the reception of all USS and their corresponding time.

In some other embodiments, the process is initiated by the first network node 104 by sending a request to the third network node 108. The request instructs the third network node 108 to request other network nodes 106, 106' to store the received USS and corresponding time stamps of reception.

In some other embodiments, the handover decisions are taken after the neighbour node relations are established. That is, Action 907 of the uplink based solution and Action 1009 of the hybrid based solution take place at the end of the corresponding Actions.

Figure 11:
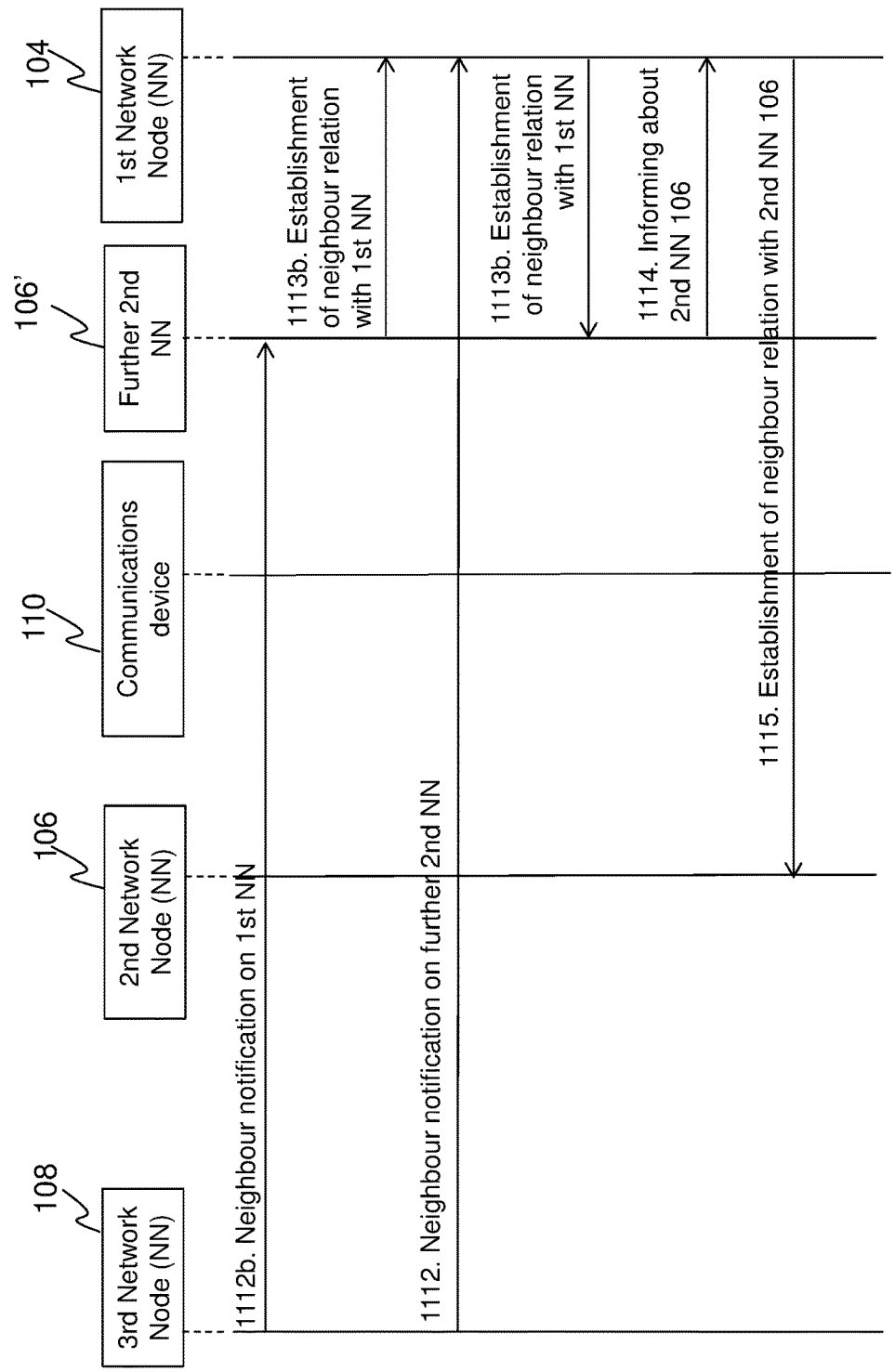
FIG. 11 is a schematic combined flowchart and signalling scheme of some second embodiments of a wireless communications network relating to hybrid based AMM.

FIG. 11 is a schematic combined flowchart and signalling scheme of some further embodiments of a wireless communications network 100 comprising hybrid based AMM.

In the description of FIG. 11, the second network node 106 is the source node in the handover procedure and hence it is sometimes referred to as a serving node, and the one or more further second network nodes 106' is referred to as target nodes since it is the target node in the handover procedure. The target node is a known neighbouring node to the serving node, e.g. the second network node 106. However, it should be understood that the second network node 106 may be a target node in a handover procedure and that one out of the one or more further second network nodes 106' may be the source node, e.g. a serving node, in the handover procedure. Further, the first network node 104 is a new node, e.g. a newly deployed node.

Actions used in some embodiments for hybrid based AMM solutions are further explained below. It should be understood that one or more actions may be optional, that actions may be taken in another suitable order and that actions may be combined.

In some further embodiments, e.g. when a hybrid based AMM mobility solution is used as depicted in FIG. 11, the first network node 104 and the one or more further second network node 106' neighbour relation is established using similar procedures as explained above for FIG. 10. Thus, Actions 1101-1113b correspond to Actions 1001-1013b previously described, and will therefore not be described in more detail. Then in Action 1114, the one or more further second network node 106' inform the first network node 104 about the presence of the second network node 106 as yet another possible neighbour for the first network node 104. Thereafter, in Action 1115, the first network node 104 may initiate a neighbour relation establishment with the second network node 106.

ABBREVIATIONS

AAS Active Antenna Systems
AN Access Node
ANR Automatic Neighbour Relation
BS Base Station
LTE Long Term Evolution
MIMO Multi Input Multi Output
MRS Mobility Reference Signal
RA Random Access
RACH Random Access Channel
RAR Random Access Response
RAT Radio Access Technology
UE User Equipment
USS Uplink Synchronisation Signal
WCDMA Wideband Code Division Multiple Access When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a radio network node operating in a wireless communications network, wherein the method comprises:
transmitting information to a further network node identifying an uplink synchronization signal received at the radio network node and indicating a corresponding reception time; and
establishing a neighbor relation with another radio network node in the wireless communications network, responsive to receiving an indication that the other radio network node neighbors the radio network node, the indication based on the further network node determining that the other radio network node received the same uplink synchronization signal at substantially the same corresponding reception time.

2. The method of claim 1, further comprising collecting the information sent to the further network node responsive to receiving a preceding request from the further network node.

3. The method of claim 1, further comprising transmitting a request to the further network node, requesting that the further network node configure one or more other radio network nodes to collect information identifying uplink synchronization signals received at the one or more other radio network nodes, along with corresponding reception times, for use by the further network node in identifying neighboring radio network nodes.

4. The method of claim 1, wherein the indication is received from the further network node or the other radio network node, and wherein the indication comprises a request for the radio network node to establish the neighbor relation with the other radio network node.

5. The method of claim 1, wherein transmitting the information to the further network node comprises transmitting the information responsive to the uplink synchronization signal being received at a signal strength above a defined threshold.

6. The method of claim 1, wherein establishing the neighbor relation with the other radio network node comprises:
setting up a communications link with the other radio network node; and
updating neighbor information with information relating to the other radio network node.

7. The method of claim 1, wherein the uplink synchronization signal is received in response to transmitting a mobility reference signal to a communications device when a mobility procedure involving the communications device is a hybrid Active Mode Mobility (AMM) procedure.

8. The method of claim 7, further comprising receiving, from one or more further radio network nodes, a request to turn on one or more mobility beams, and wherein transmitting the mobility reference signal comprises transmitting, to the one or more further radio network nodes, a mobility reference signal configuration and a corresponding uplink synchronization signal mapping.

9. A radio network node configured for operation in a wireless communications network, wherein the radio network node comprises:
communication circuitry; and
processing circuitry operatively associated with the communication circuitry and configured to:
transmit information to a further network node identifying an uplink synchronization signal received at the radio network node and indicating a corresponding reception time; and
establish a neighbor relation with another radio network node in the wireless communications network, responsive to receiving an indication that the other radio network node neighbors the radio network node, the indication based on the further network node determining that the other radio network node received the same uplink synchronization signal at substantially the same corresponding reception time.

10. The radio network node of claim 9, wherein the processing circuitry is configured to collect the information sent to the further network node responsive to receiving a preceding request from the further network node.

11. The radio network node of claim 9, wherein the processing circuitry is configured to transmit a request to the further network node, requesting that the further network node configure one or more other radio network nodes to collect information identifying uplink synchronization signals received at the one or more other radio network nodes, along with corresponding reception times, for use by the further network node in identifying neighboring radio network nodes.

12. The radio network node of claim 9, wherein the indication is received from the further network node or the other radio network node, and wherein the indication comprises a request for the radio network node to establish the neighbor relation with the other radio network node.

13. The radio network node of claim 9, wherein the processing circuitry is configured to transmit the information to the further network node responsive to the uplink synchronization signal being received at a signal strength above a defined threshold.

14. The radio network node of claim 9, wherein the processing circuitry is configured to establish the neighbor relation with the other radio network node by:
 setting up a communications link with the other radio network node; and
 updating neighbor information with information relating to the other radio network node.

15. The radio network node of claim 9, wherein the uplink synchronization signal is received in response to transmitting a mobility reference signal to a communications device when a mobility procedure involving the communications device is a hybrid Active Mode Mobility (AMM) procedure.

16. The radio network node of claim 15, wherein the processing circuitry is configured to:
 receive, from one or more further radio network nodes, a request to turn on one or more mobility beams; and
 transmit the mobility reference signal by transmitting, to the one or more further radio network nodes, a mobility reference signal configuration and a corresponding uplink synchronization signal mapping.

17. A method performed by a network node operating in a wireless communications network, the method comprising:
 receiving information from each of two or more radio network nodes, the information from each radio network node indicating identities and reception times for one or more uplink synchronization signals received at the radio network node; and
 identifying the two or more radio network nodes as neighboring radio network nodes based on determining that the two or more radio network nodes received the same uplink synchronization signal or signals at substantially the same reception time or times; and
 sending an indication of the neighbor relationship to at least one of the two or more radio network nodes.

18. The method of claim 17, further comprising, in advance of receiving the information, sending requests to the two or more radio network nodes, requesting the collection of the information.

19. The method of claim 17, further comprising sending requests for the information to the two or more radio network nodes for the information and receiving the information responsive to the requests for the information.

20. A radio network node configured for operation in a wireless communications network, wherein the radio network node comprises:
 communication circuitry; and
 processing circuitry operatively associated with the communication circuitry and configured to:
  receive information from each of two or more radio network nodes, the information from each radio network node indicating identities and reception times for one or more uplink synchronization signals received at the radio network node; and
  identify the two or more radio network nodes as neighboring radio network nodes based on determining that the two or more radio network nodes received the same uplink synchronization signal or signals at substantially the same reception time or times; and
  send an indication of the neighbor relationship to at least one of the two or more radio network nodes.

21. The radio network node of claim 20, wherein the processing circuitry is configured to, in advance of receiving the information, send requests to the two or more radio network nodes, requesting the collection of the information.

22. The radio network node of claim 20, wherein the processing circuitry is configured to send requests for the information to the two or more radio network nodes for the information and receive the information responsive to the requests for the information.

23. A non-transitory computer readable medium storing a computer program comprising instructions that, when executed on at least one processor of a radio network node configured for operation in a wireless communications network, cause the radio network node to:
 transmit information to a further network node identifying an uplink synchronization signal received at the radio network node and indicating a corresponding reception time; and
 establish a neighbor relation with another radio network node in the wireless communications network, responsive to receiving an indication that the other radio network node neighbors the radio network node, the indication based on the further network node determining that the other radio network node received the same uplink synchronization signal at substantially the same corresponding reception time.

24. A non-transitory computer readable medium storing a computer program comprising instructions that, when executed on at least one processor of a radio network node configured for operation in a wireless communications network, cause the radio network node to:
 receive information from each of two or more radio network nodes, the information from each radio network node indicating identities and reception times for one or more uplink synchronization signals received at the radio network node; and
 identify the two or more radio network nodes as neighboring radio network nodes based on determining that the two or more radio network nodes received the same uplink synchronization signal or signals at substantially the same reception time or times; and
 send an indication of the neighbor relationship to at least one of the two or more radio network nodes.

* * * * *